United States Patent
Choe et al.

(10) Patent No.: US 12,399,633 B2
(45) Date of Patent: Aug. 26, 2025

(54) STORAGE DEVICE WITH VARIABLE CELL AREA SIZE AND OPERATING METHOD THEREOF

(71) Applicant: SAMSUNG ELECTRONICS CO., LTD., Suwon-si (KR)

(72) Inventors: Gyuseok Choe, Suwon-si (KR); Seongheum Baik, Suwon-si (KR); Myungsub Shin, Suwon-si (KR); Youngmin Lee, Suwon-si (KR); Seongyong Jang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/497,087

(22) Filed: Oct. 30, 2023

(65) Prior Publication Data

US 2024/0272816 A1   Aug. 15, 2024

(30) Foreign Application Priority Data

Feb. 9, 2023   (KR) .......................... 10-2023-0017573

(51) Int. Cl.
*G06F 3/06* (2006.01)

(52) U.S. Cl.
CPC .......... *G06F 3/0631* (2013.01); *G06F 3/0604* (2013.01); *G06F 3/0647* (2013.01); *G06F 3/0656* (2013.01); *G06F 3/0679* (2013.01)

(58) Field of Classification Search
CPC .... G06F 3/0631; G06F 3/0604; G06F 3/0647; G06F 3/0656; G06F 3/0679
See application file for complete search history.

(56) References Cited

U.S. PATENT DOCUMENTS

| | | |
|---|---|---|
| 11,237,769 B2 | 2/2022 | Kanno |
| 11,269,558 B2 | 3/2022 | Kanno et al. |
| 11,327,681 B2 | 5/2022 | Shin et al. |
| 11,455,244 B2 | 9/2022 | Tikoo et al. |
| 11,586,385 B1* | 2/2023 | Lercari ..................... G06F 1/30 |
| 2019/0332298 A1* | 10/2019 | Madabhushi ......... G06F 3/0679 |
| 2021/0318820 A1 | 10/2021 | Jin et al. |
| 2022/0137840 A1 | 5/2022 | Lee |
| 2022/0350530 A1 | 11/2022 | Yoshida et al. |
| 2023/0384966 A1* | 11/2023 | Sela ...................... G06F 3/0685 |
| 2024/0053900 A1* | 2/2024 | Vaghasiya ............. G06F 3/0616 |
| 2024/0069806 A1* | 2/2024 | Bolisetty ................. G06F 3/064 |
| 2024/0220138 A1* | 7/2024 | Inbar ..................... G06F 11/004 |

\* cited by examiner

*Primary Examiner* — Edward J Dudek, Jr.
(74) *Attorney, Agent, or Firm* — Morgan, Lewis & Bockius LLP

(57) ABSTRACT

A storage device and an operating method of the same are disclosed. The storage device includes a memory controller and a non-volatile memory, wherein the memory controller is configured to calculate a number of zones, which are spaces allocated to logical addresses, based on a cell area size of first storage areas of the non-volatile memory, and provide the number of zones to a host, is configured to generate multiple zones of a number within the calculated number of zones, and to map a logical address of each zone to a physical address of at least one of the first storage areas, and is configured to, in response to a first write request from the host, write data included in the first write request into first storage areas corresponding to a zone indicated by the first write request.

20 Claims, 17 Drawing Sheets

FIG. 11

QUERY REQUEST UPIU

| 0 | 1 | 2 | 3 |
|---|---|---|---|
| xx01 0110b | Flags | Reserved | Task Tag |
| 4 | 5 | 6 | 7 |
| Reserved | Query Function | Reserved | Reserved |
| 8 | 9 | 10 | 11 |
| Total EHS Length (00h) | SLC Area Length | (MSB) Data Segment Length | (LSB) |
| 12 | 13 | 14 | 15 |
| Transaction Specific Fields ||||
| 16 | 17 | 18 | 19 |
| Transaction Specific Fields ||||
| 20 | 21 | 22 | 23 |
| Transaction Specific Fields ||||
| 24 | 25 | 26 | 27 |
| Transaction Specific Fields ||||
| 28 | 29 | 30 | 31 |
| Reserved ||||
| Header E2ECRC (omit if HD=0) ||||
| k | k+1 | k+2 | k+3 |
| Data[0] | Data[1] | Data[2] | Data[3] |
| ... | ... | ... | ... |
| k+ Length-4 Data[Length-4] | k+ Length-3 Data[Length-3] | k+ Length-2 Data[Length-2] | k+ Length-1 Data[Length-1] |
| Data E2ECRC (omit if DD=0) ||||

FIG. 12

| Bit<br>Byte | 7 | 6 | 5 | 4 | 3 | 2 | 1 | 0 |
|---|---|---|---|---|---|---|---|---|
| 0 | OPERATION CODE (2Ah) | | | | | | | |
| 1 | WRPROTECT = 000b | | | DPO | FUA | Reserved | FUA_NV<br>= 0b | Obsolete |
| 2 | (MSB) | | | | | | | |
| 3 | LOGICAL BLOCK ADDRESS | | | | | | | |
| 4 | | | | | | | | |
| 5 | | | | | | | | (LSB) |
| 6 | Data Temperature | | | | GROUP NUMBER | | | |
| 7 | (MSB) | | | | | | | |
| 8 | TRANSFER LENGTH | | | | | | | (LSB) |
| 9 | CONTROL = 00h | | | | | | | |

STORAGE DEVICE WITH VARIABLE CELL AREA SIZE AND OPERATING METHOD THEREOF

CROSS-REFERENCE TO RELATED APPLICATION

This application claims priority under 35 U.S.C. § 119 to Korean Patent Application No. 10-2023-0017573, filed on Feb. 9, 2023, in the Korean Intellectual Property Office, the disclosure of which is incorporated by reference herein in its entirety.

FIELD

The inventive concept relates to a storage device, and more particularly, to a storage device configured for calculating the number of usable zones based on the size of a variable per-level cell area, and an operating method thereof.

DISCUSSION

Non-volatile memory may retain stored data even when power is cut off. Storage device formats include flash-based non-volatile memories such as embedded multi-media card (eMMC), universal flash storage (UFS), solid-state drive (SSD), and memory card. Storage devices based on such formats may be usefully employed to store or move data.

A data processing system including a storage device may be referred to as a storage system, and the storage system may include a host and a storage device. The host and the storage device may be connected to each other through various interface standards.

SUMMARY

An embodiment of the inventive concept provides a storage device that calculates the number of usable zones based on the cell area size of a single-level cell (SLC) area, and allows the host to vary the cell area size of the SLC area, thereby optimizing performance in multiple application operations.

According to an embodiment of the inventive concept, there is provided a storage device including a memory controller and a non-volatile memory, wherein the memory controller is configured to: calculate a number of zones, which are spaces allocated to logical addresses, based on a cell area size of first storage areas of the non-volatile memory, and provide the number of zones to a host; generate multiple zones of a number within the calculated number of zones, and to map a logical address of each of the multiple zones to a physical address of at least one of the first storage areas; and in response to a first write request from the host, write data included in the first write request into first storage areas corresponding to a zone indicated by the first write request.

According to an embodiment of the inventive concept, there is provided an operating method of a storage device including a memory controller and a non-volatile memory including calculating the number of zones, which are spaces allocated to logical addresses, based on cell area sizes of first storage areas of a non-volatile memory, providing a number of zones to a host, generating multiple zones of a number within the calculated number of zones, mapping a logical address of each zone to a physical address of at least one of the first storage areas, and in response to a first write request from the host, writing data included in the first write request into first storage areas corresponding to a zone indicated by the first write request.

According to an embodiment of the inventive concept, there is provided a storage system which includes a host and a storage device, wherein the storage device is configured to calculate a number of zones, which are spaces allocated to logical addresses, based on a cell area size of first storage areas of the storage device, and to provide the number of zones to a host; generate multiple zones of a number within the calculated number of zones, and to map a logical address of each zone to a physical address of at least one of the first storage areas; and in response to a first write request from the host, write data included in the first write request into first storage areas corresponding to a zone indicated by the first write request.

BRIEF DESCRIPTION OF THE DRAWINGS

An embodiment of the inventive concept will be more clearly understood from the following detailed description taken in conjunction with the accompanying drawings, in which:

FIG. 11 is a data structure diagram illustrating a data structure of a query request UPIU according to an embodiment;

FIG. 12 is a data structure diagram illustrating a data structure of a write command UPIU according to an embodiment;

DETAILED DESCRIPTION

By way of example, non-limiting embodiments of the present disclosure are described in detail with reference to the accompanying drawings.

Figure 1:
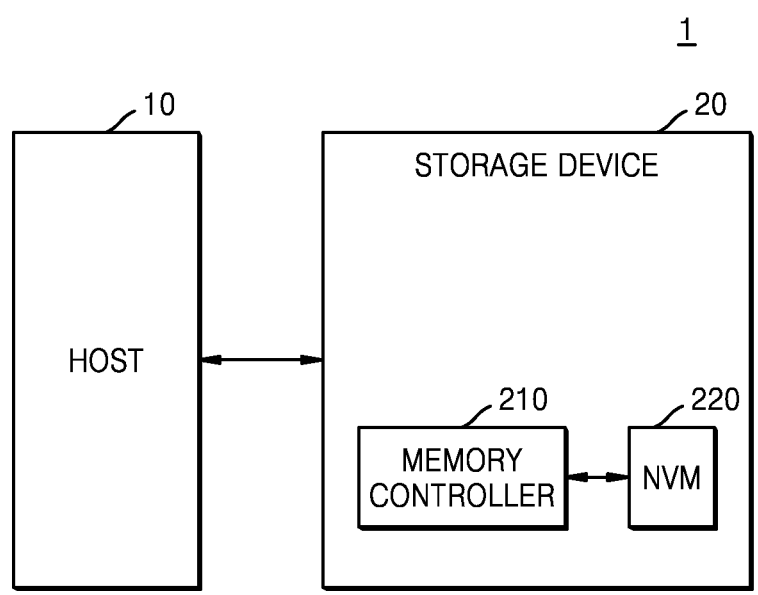
FIG. 1 is a block diagram illustrating a storage system according to an embodiment.

FIG. 1 illustrates a storage system according to an embodiment.

Referring to FIG. 1, a storage system 1 may include a host 10 and a storage device 20.

In an embodiment, the storage device 20 may be implemented as an internal memory embedded into an electronic device, and may be, for example, an embedded universal flash storage (UFS) memory device, an embedded multimedia card (eMMC), or a solid-state drive (SSD). In an embodiment, the storage device 20 may be implemented as an external memory detachable from an electronic device, for example, a UFS memory card, compact flash (CF), secure digital (SD), micro secure digital (Micro-SD), mini secure digital (Mini-SD), extreme digital (xD), or memory stick.

The host 10 may provide logical addresses and commands to the storage device 20. During a write operation, the host 10 may request the storage device 20 to program data to be written into the storage region of the non-volatile memory 220 corresponding to the logical address. During a read operation, the host 10 may request the storage device 20 to sense data to be read from the storage region of the non-volatile memory 220 corresponding to the logical address.

The storage device 20 may include a memory controller 210 connected to a non-volatile memory 220. The memory controller 210 may perform overall control of the storage device 20. Data read from the non-volatile memory 220 may be provided to the host 10, and data provided from the host 10 may be written into the non-volatile memory 220.

The memory controller 210 may control the non-volatile memory 220 to read data stored in the non-volatile memory 220 or to write data to the non-volatile memory 220 in response to a write and/or read request from the host 10.

In detail, the memory controller 210 may control write, read, and erase operations of the non-volatile memory 220 by providing addresses, commands, and control signals to the non-volatile memory 220. In addition, data to be written and data that has been read may be transmitted and received between the memory controller 210 and the non-volatile memory 220.

Figure 2:
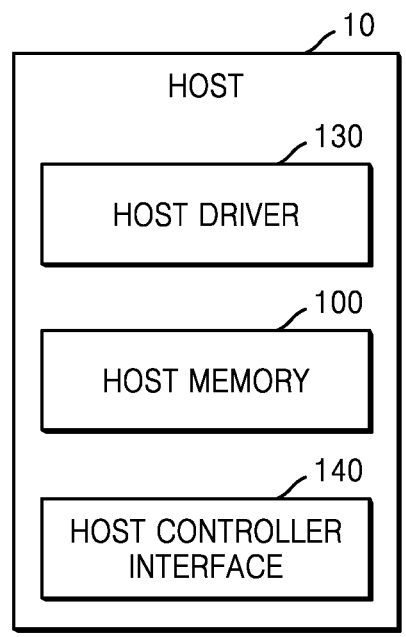
FIG. 2 is a block diagram illustrating a host according to an embodiment.

FIG. 2 illustrates a host 10 according to an embodiment.

Referring to FIG. 2, the host 10 may include a host driver 130, a host memory 100, and a host controller interface 140. The host 10 may be assumed and described as a UFS host conforming to the UFS standard, but embodiments are not limited thereto.

In an embodiment, the host driver 130 may convert I/O requests generated by applications into UFS commands defined by the UFS standard, and transmit the UFS commands to the host controller interface 140. One I/O request may be translated into multiple UFS commands. The I/O requests may also be referred to as task requests. The UFS command may be based on a concept including UFS protocol information units (UPIU) conforming to the UFS standard. The UFS commands may be or include commands defined by a small computer system interface (SCSI) standard, but may also or alternatively be or include commands specific to the UFS standard.

The host controller interface 140 may transmit each UFS command converted by the UFS driver 130 to the storage device 20. In FIG. 2, although the host memory 100 is shown as a separate component from the host controller interface 140; in an embodiment, the host memory 100 may be included in the host controller interface 140. The host controller interface 140 may copy data from a normal region of the host memory 100 to a cache region of the host memory 100 by controlling the host memory 100. The host controller interface 140 may transmit a logical address, such as a logical block address (LBA), to the storage device 20.

Figure 3:
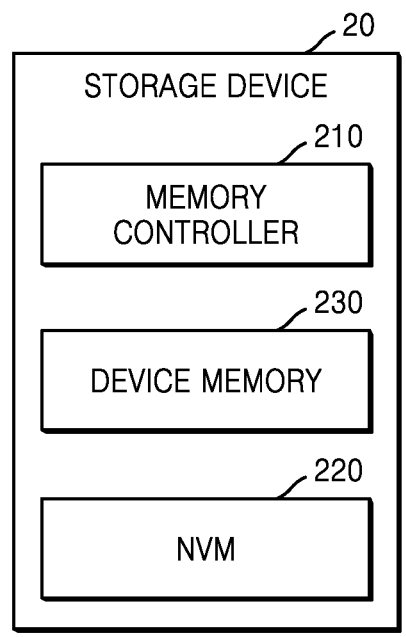
FIG. 3 is a block diagram illustrating a storage device according to an embodiment.

FIG. 3 illustrates a storage device 20 according to an embodiment. FIG. 3 may be described with reference to FIG. 1.

Referring to FIG. 3, the storage device 20 may include a memory controller 210, a device memory 230 and a non-volatile memory 220. Descriptions of the memory controller 210 and the non-volatile memory 220 have already been provided with reference to FIG. 1, and substantially duplicate description may be omitted.

The device memory 230 may temporarily store data to be written into the non-volatile memory 220 or data that has been read from the non-volatile memory 220. The device memory 230 may include static random-access memory (SRAM) or dynamic random-access memory (DRAM).

The memory controller 210 may calculate the number of zones, as may be described in greater detail below with reference to FIG. 8, based on the cell area size of a single-level cell (SLC) area, without limitation thereto.

According to an embodiment, multi-application performance of the storage device 20 may be optimized as the maximum number of open zones increases.

In detail, although up to two open zones could be provided to the host 10 by calculating the number of open zones based on the buffer of the memory controller 210, but when the maximum number of open zones is calculated based on the size of the SLC region, multiple open zones may be provided to the host 10. Thus, the number of operations that may be simultaneously performed by the storage device 20 may be optimized.

In addition, the memory controller 210 may vary the size of each corresponding SLC area for each data unit to be written depending on the locality and type of data to be written and based on the size of the SLC area included in the request from the host 10, as may be described in greater detail below with reference to FIG. 8.

According to an embodiment, the performance of an SLC write operation for hot data may be optimized by adjusting the size of the SLC area depending on the type and temperature of data. In detail, by making the SLC area corresponding to hot data or warm data greater than the SLC area corresponding to cold data, the performance of the SLC write operation for hot data or warm data may be optimized.

According to an embodiment, the host may change the size of the SLC area, thereby optimizing performance in the multiple application operations.

Figure 4:
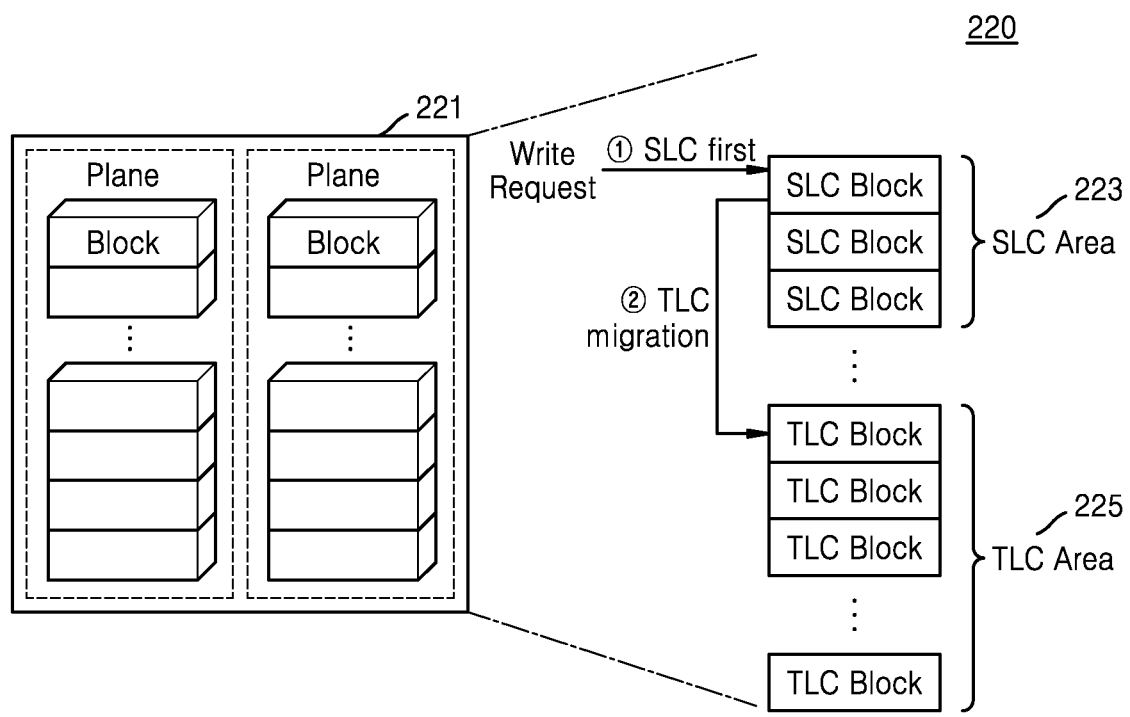
FIG. 4 is a conceptual diagram for explaining a non-volatile memory according to an embodiment.

FIG. 4 illustrates an example for explaining a non-volatile memory 220 according to an embodiment FIG. 4 may be described with reference to FIG. 3.

Referring to FIG. 4, the non-volatile memory 220 may include a memory cell array 221.

For example, the multiple memory cells included in the memory cell array 221 may be non-volatile memory cells that maintain stored data even when power is cut off. In detail, when the memory cell is a non-volatile memory cell, the non-volatile memory 220 may be an electrically erasable programmable read-only memory (EEPROM), a flash memory, a phase change random-access memory (PRAM), resistance random-access memory (RRAM), a nano floating gate memory (NFGM), a polymer random-access memory (PoRAM), a magnetic random-access memory (MRAM), or a ferroelectric random-access memory (FRAM). Hereinafter, an embodiment of the inventive concept are described taking a case in which multiple memory cells are NAND flash memory cells as an example, but the inventive concept is not limited thereto.

The memory cell array 221 may include multiple memory blocks, and each memory block may have a planar structure or a three-dimensional structure. The memory cell array 221 may include at least one of a single-level cell (SLC) block including SLCs, a multi-level cell (MLC) block including MLCs, a double-level cell (DLC) block including DLCs, a triple-level cell (TLC) block including TLCs, and a quad-level cell (QLC) block including QLCs, without limitation thereto. For example, some memory blocks among the multiple memory blocks may be the SLC blocks, and other memory blocks may be the DLC blocks, the TLC blocks, and/or the QLC blocks, respectively. In an embodiment, referring to FIG. 4, the memory cell array 221 may include an SLC area 223 that is a set of single-level cell blocks and a TLC area 225 that is a set of triple-level cell blocks.

Each memory cell included in the memory cell array 221 may store data of 2 bits or more. For example, the memory cell may be an MLC that stores 2-bit data. As another example, the memory cell may be a TLC that stores 3-bit data or a QLC that stores 4-bit data. Hereinafter, a memory cell storing data of 2 or more bits is referred to as an MLC. For example, the MLC may include one or more of the DLC, the TLC, and the QLC. In an embodiment, some memory cells included in the memory cell array 221 may be SLCs that store 1-bit data, and other memory cells may be MLCs that store 2-bit data, 3-bit data, 4-bit data, or more bits of data per memory cell.

In an embodiment, the memory cell array 221 may include a three-dimensional (3D) memory cell array, the 3D memory cell array may include multiple NAND strings, and each NAND string may include memory cells respectively connected to word-lines vertically stacked on a substrate. However, the inventive concept is not limited thereto. For example, in an embodiment, the memory cell array 221 may include a two-dimensional (2D) memory cell array.

In addition, the memory cell array 221 may include a first number of memory cell planes including a second number of memory blocks, without limitation thereto. Here, the memory cell array may include a first times second number of memory blocks.

The non-volatile memory 220 may be configured for each memory cell plane to perform a different operation on a memory cell plane basis. That is, the memory cell plane may be a set of memory blocks in which one operation of the non-volatile memory 220 is independently performed. For example, the non-volatile memory 220 may simultaneously perform a read operation from a first memory block of a first memory cell plane and a read operation from a second memory block on a second memory cell plane. This may be referred to as a plane independent read (PIR) or plane independent core (PIC).

In an embodiment, the storage device 20 may perform an SLC buffering operation. The SLC buffering operation represents an operation of preferentially writing data included in a write request into an SLC area among a series of operations of first writing the data included in the write request to the SLC area and later migrating the corresponding data to the MLC region.

Referring to FIG. 4, the memory cell array 221 may include an SLC area 223 that is a set of single-level cell blocks and a TLC area 225 that is a set of triple-level cell blocks.

The storage device 20 may divide the data included in the write request in response to the write request of the host 10, and may preferentially write the corresponding data into the single-level cell block of the SLC area 223.

When a predetermined condition is satisfied, the storage device 20 may migrate data previously written into the single-level cell (SLC) region 223 from the SLC region into the triple-level cell region 225. When a predetermined condition is satisfied, in response to a write request from the host 10, a case where the storage device 20 no longer has a single-level cell block available for writing may be included.

Figure 5:
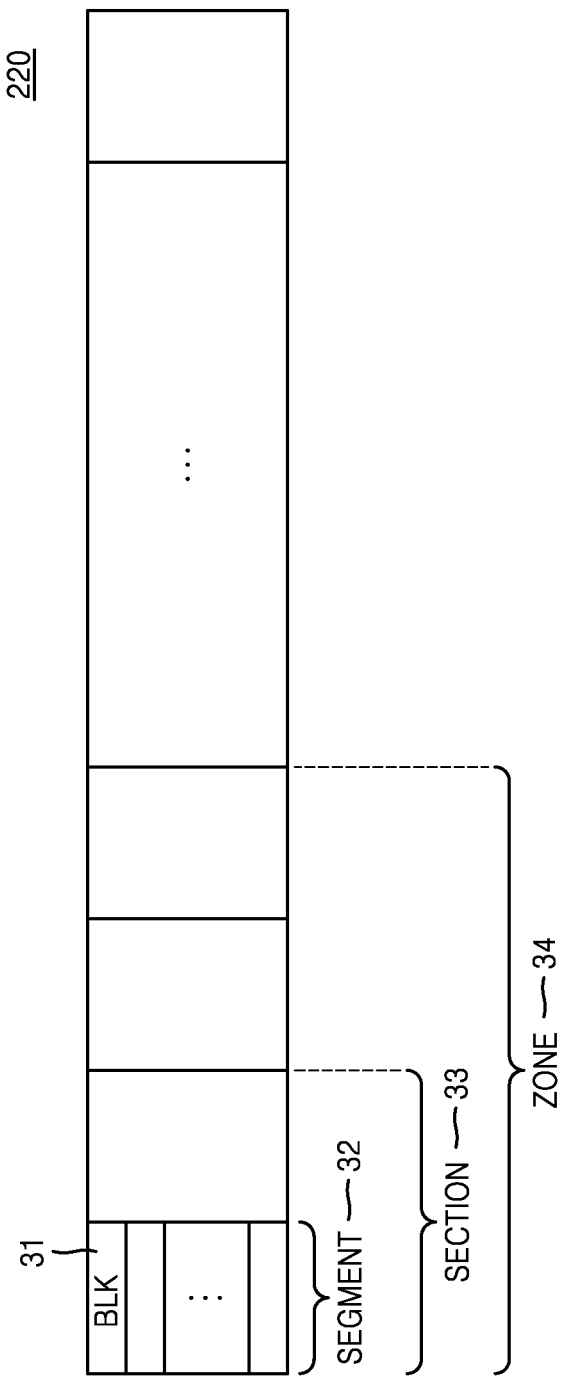
FIG. 5 is a block diagram illustrating the non-volatile memory of FIG. 1.

FIG. 5 illustrates the non-volatile memory 220 of FIG. 1.

Referring to FIG. 5, a storage region of the non-volatile memory 220 may be configured to include blocks 31, segments 32, sections 33, and zones 34. Here, the storage region may represent a space allocated in correspondence with a logical address.

The storage region of the non-volatile memory 220 may include multiple zones 34. Each zone 34 may include multiple sections 33, each section 33 may include multiple segments 32, and each segment 32 may include multiple blocks 31.

For example, the block 31 may be a storage region for storing 4 KB data, and the segment 32 may be a storage region for storing 2 MB data by including 512 blocks 31. The configuration of the non-volatile memory 220 as shown in FIG. 5 may be determined at the time of formatting the non-volatile memory 220, but is not limited thereto. Moreover, a section may include two or more segments, and a zone may include two or more sections. The non-volatile memory 220 may read and write data in units of 4 KB pages. That is, one page may be stored in block 31.

Figure 6:
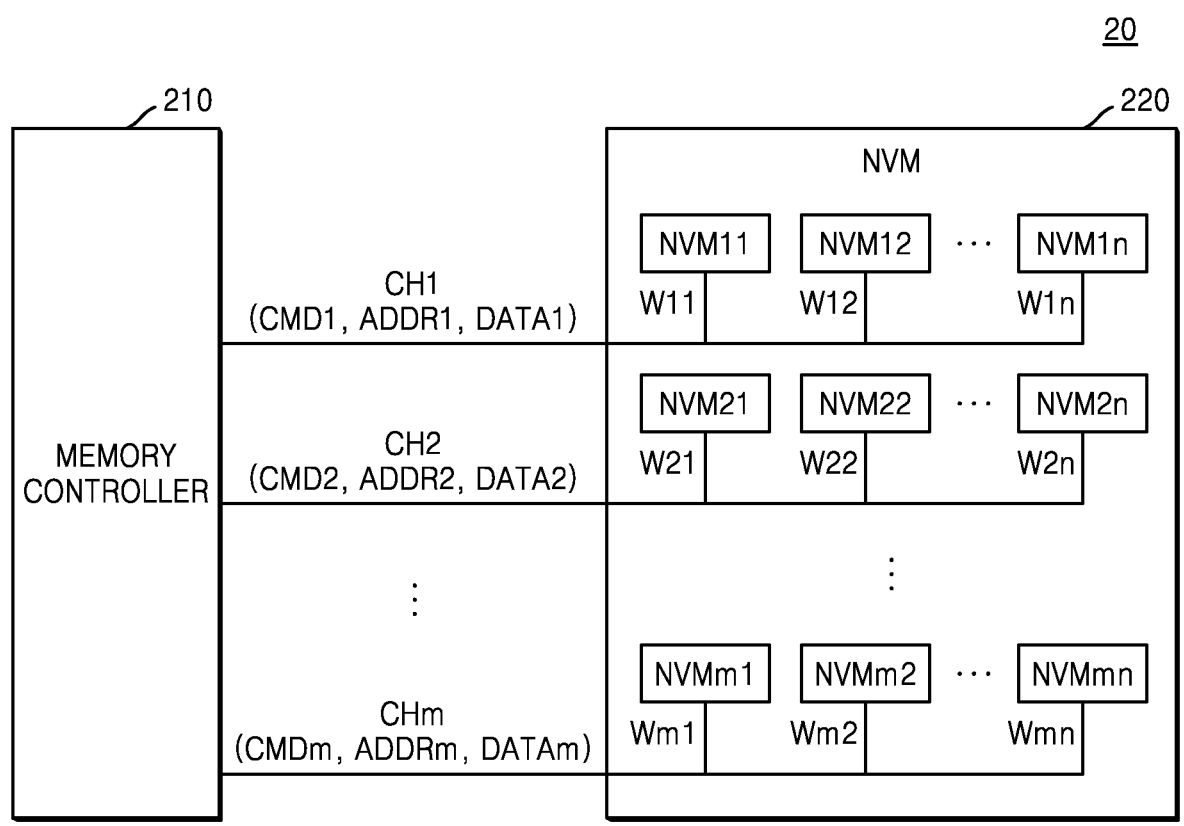
FIG. 6 is a block diagram illustrating the storage device of FIG. 1.

FIG. 6 illustrates the storage device 20 of FIG. 1. FIG. 6 may be described with reference to FIG. 3.

Referring to FIG. 6, the storage device 20 may include a memory controller 210 and a non-volatile memory 220. The storage device 20 may support multiple channels CH1 to CHm, where m is a natural number, and the non-volatile memory 220 and the memory controller 210 may be connected to each other through the multiple channels CH1 to CHm. For example, the storage device 20 may be implemented as a storage device such as a solid-state drive (SSD).

The non-volatile memory 220 may include multiple non-volatile memory devices NVM11 to NVMmn, where n is a natural number. Each of the non-volatile memory devices NVM11 to NVMmn may be connected to one of the multiple channels CH1 to CHm through a corresponding connection way. For example, the non-volatile memory devices NVM11 to NVM1$n$ may be connected to the first channel CH1 through ways W11 to W1$n$, and non-volatile memory devices NVM21 to NVM2$n$ may be connected to the second channel CH2 through ways W21 to W2$n$. In an embodiment, each of the non-volatile memory devices NVM11 to NVMmn may be implemented as an arbitrary memory unit capable of operating based on individual commands from the memory controller 210. For example, each of the non-volatile memory devices NVM11 to NVMmn may be implemented as a chip or die, but the present invention is not limited thereto.

The memory controller 210 may transmit and receive signals to and from the non-volatile memory 220 through multiple channels CH1 to CHm. For example, the memory controller 210 may transmit commands CMD1 to CMDm, addresses ADDR1 to ADDRm, and data DATA1 to DATAm to the non-volatile memory 220, or receive data DATA1 to DATAm from the non-volatile memory 220, through channels CH1 to CHm.

The memory controller 210 may select one of the non-volatile memory devices connected to the corresponding channel through each channel and transmit and/or receive signals to and/or from the selected non-volatile memory device. For example, the memory controller 210 may select the non-volatile memory device NVM11 from among the non-volatile memory devices NVM11 to NVM1n connected to the first channel CH1. The memory controller 210 may transmit the command CMD1, the address ADDR1, and the data DATA1 to the selected non-volatile memory device NVM11 or may receive data from the selected non-volatile memory device NVM11, through the first channel CH1.

The memory controller 210 may transmit and receive signals to and from the non-volatile memory 220 in parallel through different channels. For example, the memory controller 210 may transmit the command CMD2 to the non-volatile memory 220 through the second channel CH2 while transmitting the command CMD1 to the non-volatile memory 220 through the first channel CH1. For example, the memory controller 210 may receive data DATA2 from the non-volatile memory 220 through the second channel CH2 while receiving data DATA1 from the non-volatile memory 220 through the first channel CH1.

The memory controller 210 may control overall operations of the non-volatile memory 220. The memory controller 210 may control each of the non-volatile memory devices NVM11 to NVMmn connected to the channels CH1 to CHm by transmitting a signal to the channels CH1 to CHm. For example, the memory controller 210 may control a selected one of the non-volatile memory devices NVM11 to NVM1n by transmitting the command CMD1 and the address ADDR1 through the first channel CH1.

Each of the non-volatile memory devices NVM11 to NVMmn may operate under the control of the memory controller 210. For example, the non-volatile memory device NVM11 may program data DATA1 depending on the command CMD1, address ADDR1, and data DATA1 provided through the first channel CH1. For example, the non-volatile memory device NVM21 may read data DATA2 based on the command CMD2 and address ADDR2 provided through the second channel CH2 and transmit the read data DATA2 to the memory controller 210.

FIG. 6 shows that the non-volatile memory 220 communicates with the memory controller 210 through m channels and the non-volatile memory 220 includes n non-volatile memory devices corresponding to each channel, but the number of channels and the number of non-volatile memory devices connected to each channel may be variously changed, without limitation thereto.

Figure 7:
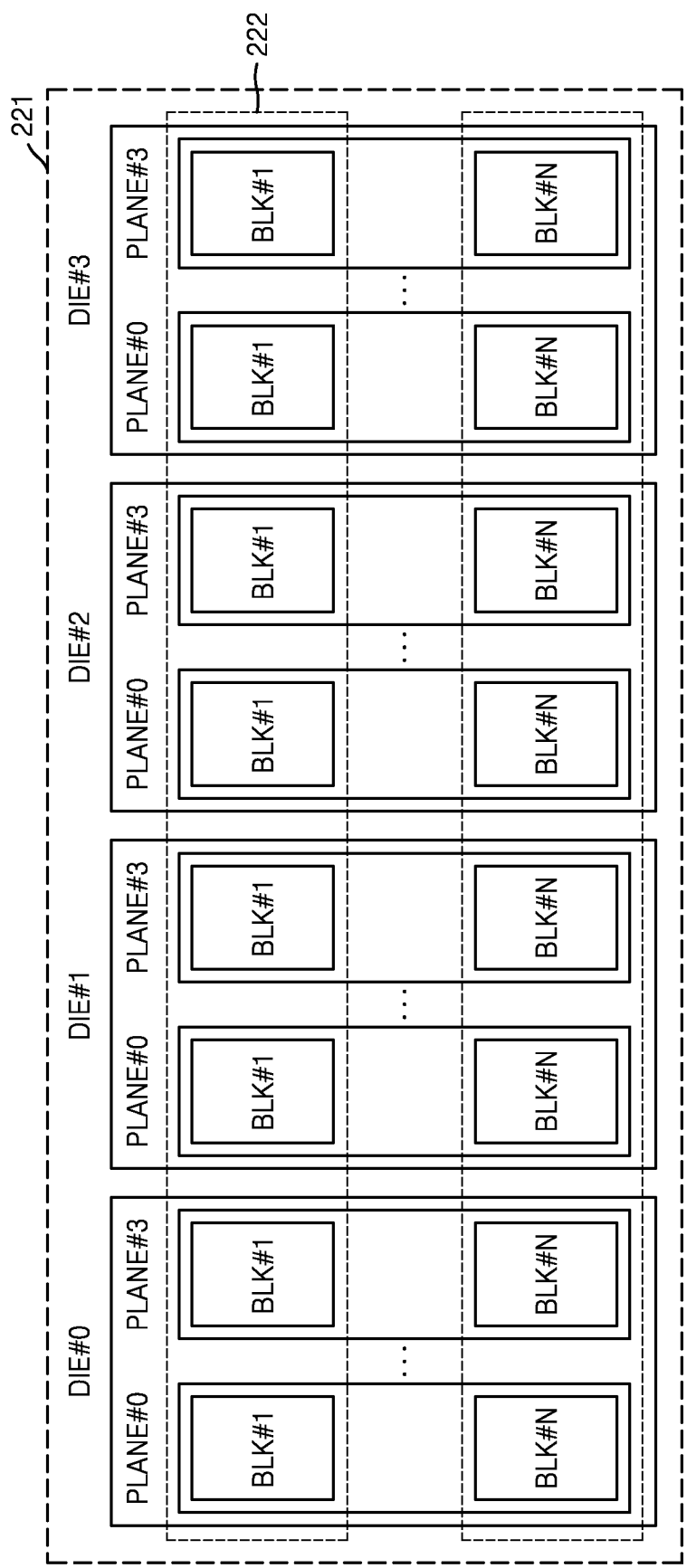
FIG. 7 is a layout diagram for explaining super block management of a storage device according to an embodiment.

FIG. 7 illustrates an example for explaining super block management of a storage device 20 according to an embodiment.

Referring to FIGS. 4 and 7, the memory cell array 221 may include multiple memory dies, for example, four memory dies DIE #0 to DIE #3. In addition, each memory die may include multiple memory cell planes each including multiple memory blocks, and may include, for example, four memory cell planes PLANE #0 to PLANE #3. The memory controller 210 may divide the memory cell array 221 of the non-volatile memory 220 into multiple super blocks to allocate control the memory cell array 221. The super blocks may each include two or more memory blocks included in the memory cell array 221. The super blocks may include multiple physical zones. The super block may be formed across multiple memory dies, and as in FIG. 7, the super block may be formed across substantially all memory dies.

In an embodiment, the super block may be a set of memory blocks having the same block number included in each memory cell plane of substantially all memory dies included in the memory cell array 221. For example, a first super block 222 may be a set of memory blocks having a block number of 1, each included in each memory cell plane of substantially all memory dies.

Figure 8:
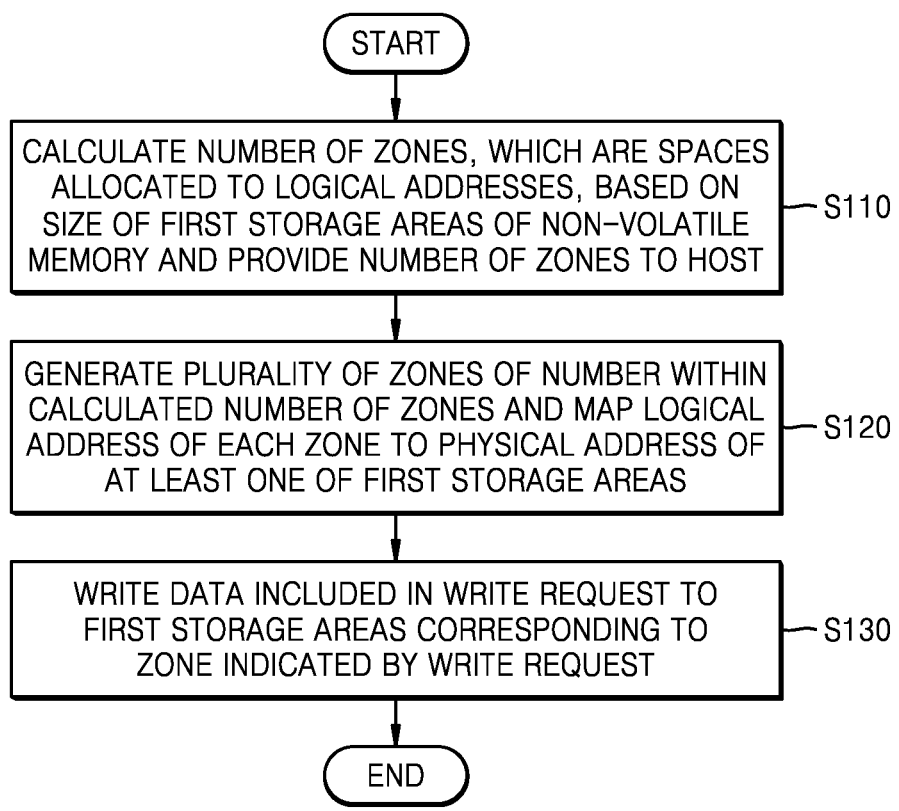
FIG. 8 is a flowchart diagram illustrating an operating method of a storage device according to an embodiment.
Figure 9:
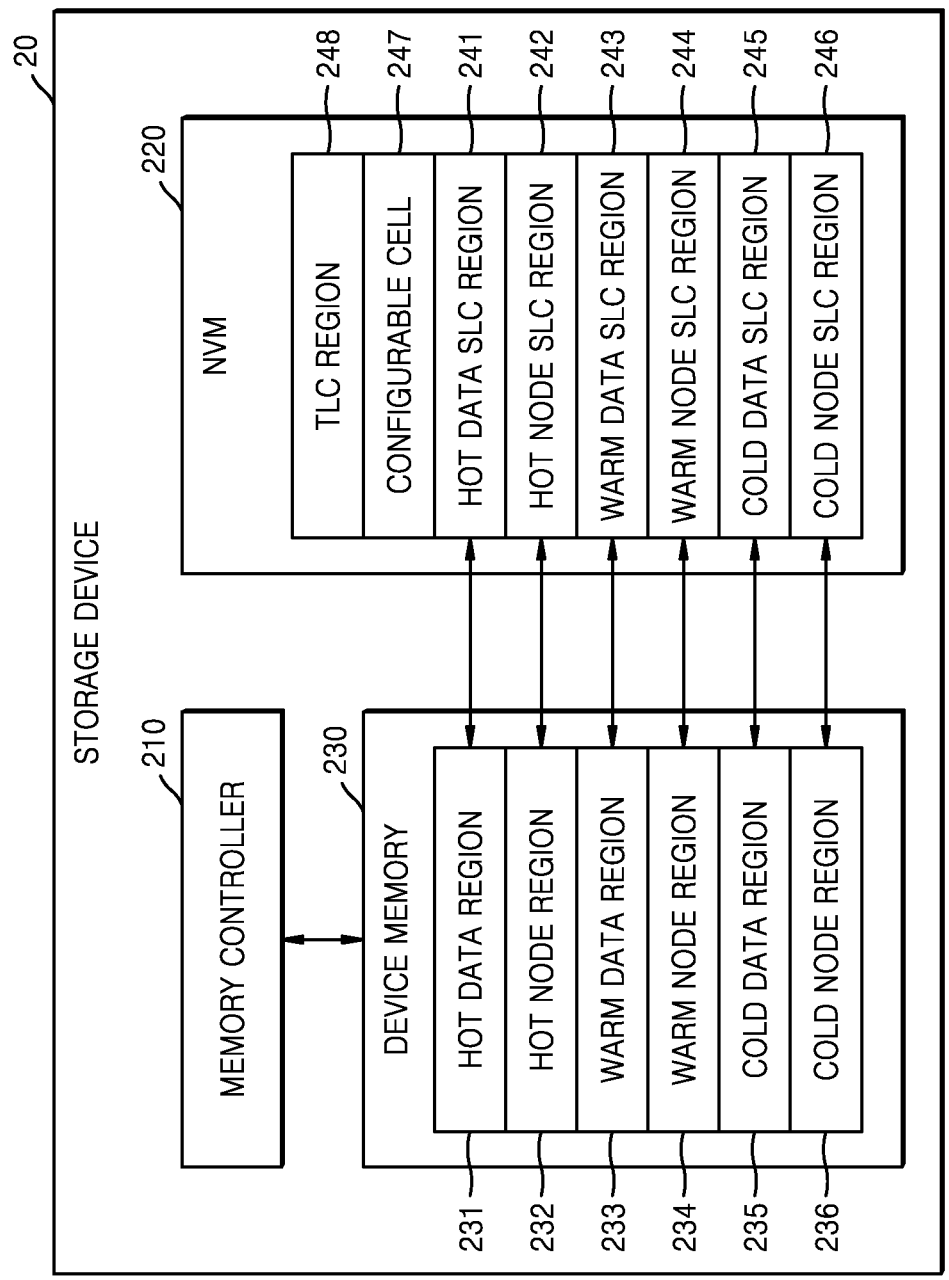
FIG. 9 is a block diagram illustrating a storage device according to an embodiment.

FIG. 8 illustrates an operating method of the storage device 20 according to an embodiment. FIG. 9 illustrates a storage device 20 according to an embodiment.

Referring to FIGS. 3, 5 and 8, in operation S110, the storage device 20 may calculate the number of zones, which are spaces allocated to logical addresses, based on the size of the first storage area of the non-volatile memory 220 and provide the number of zones to the host. Here, the first storage area may be an SLC area.

In an embodiment, the memory controller 210 may calculate the number of zones, which may be spaces allocated to logical addresses, based on the size of a super block of SLCs of the non-volatile memory 220.

When the non-volatile memory 220 includes an SLC area and a TLC area, the memory controller 210 may calculate the number of zones by Equation 1, as set forth below.

$$Num_{Zone} = \frac{\text{Super Block Size for } SLC}{\text{Size for } HSP} \quad \text{[Equation 1]}$$

Here, $Num_{Zone}$ indicates the maximum number of zones in which simultaneous write operations may be performed in the superblock of the SLC area, Size for HSP represents the size of data required for one write operation in a triple-level cell, and because the value corresponding to the Size for HSP may vary in size depending on the type of multi-level cell used by the memory controller 210, the inventive concept is not limited thereto. Super Block Size for SLC indicates the size of data within a super block in the SLC area. Here, high speed program (HSP) refers to a program operation of programming multiple data bits to multi-level cells in substantially one operation.

For example, when there are two connection ways, two memory cell planes per way, and four channels, the Super Block Size for SLC may be calculated as 16 KB (Size of SLC page)*3 (TLC weight)*4 (CH)*2 (Die)*2 (Plane)=768 KB, the Size for HSP may be calculated as 4 (CH)*2 (Die)*8 MB (Block size)=128 MB, and the $Num_{Zone}$ may be calculated as about 168. Here, when calculating the Size for HSP, the HSP operation uses the data unit when HSP is performed in the TLC area.

In an embodiment, in response to the request from the host 10, the memory controller 210 may calculate the maximum number of zones, which are spaces allocated as logical addresses, based on the number of superblocks to be used as the superblocks of the first storage areas among the multiple superblocks of the non-volatile memory 220 included in the request. Here, the request of the host 10 may be a request of the host 10 to calculate the maximum number of zones. The request of the host 10 may be described in greater detail below with reference to FIGS. 10 and 11.

When the non-volatile memory 220 includes a single-level cell (SLC) area and a triple-level cell (TLC) area, the memory controller 210 may calculate the number of zones by Equation 2 below.

$$Num_{Zone} = \frac{(\text{Super Block Size for } SLC) * (SLC \text{ Area Length})}{\text{Size for } HSP} \quad \text{[Equation 2]}$$

Here, $Num_{Zone}$ indicates the maximum number of zones in which a write operation may be performed simultaneously into the super block of the SLC area, Size for HSP represents the size of data required for one write operation into a triple-level cell, a value corresponding to the Size for HSP may vary in required size depending on the type of multi-level cell used by the memory controller 210. Therefore, the inventive concept is not limited thereto. Super Block Size for SLC indicates the size of the super block data in the SLC area, and SLC Area Length is an SLC area length that may be varied by the host 10 and indicates the number of superblocks to be used as superblocks of the SLC area among multiple superblocks. For example, when the SLC Area Length increases by 1, one super block may be further configured as an SLC area.

That is, the memory controller 210 may calculate the number of zones based on the size of the data within the superblock of the SLC area and the number of superblocks to be used as the superblocks of the SLC area among the multiple superblocks Referring to FIG. 9, the non-volatile memory 220 may include a configurable cell 247. The configurable cell 247 is an area that may be converted into an SLC area based on the length of the SLC area included in the request of the host. Although one configurable cell 247 is shown in FIG. 9, embodiments are not limited thereto. For example, the configurable cell 247 may be one or multiple configurable cells 247.

In an embodiment, the memory controller 210 may vary the size of the SLC area based on the configurable cell 247 in response to a request of the host. For example, the memory controller may receive a second write request from the host, and vary the cell area size of the first storage areas for second data from the second write request based on the locality of the second data and/or type of the second data In addition, the memory controller 210 may provide the number of zones to the host. For example, the memory controller may vary the cell area size of the first storage areas for second data from the second write request based on the size of an area included in the second write request from the host.

In an embodiment, the memory controller 210 may provide the maximum number of open zones to the host 10 based on the zoned block commands (ZBC) or like standard. In this case, the open zone indicates a zone in which a write operation and a read operation may be performed.

In operation S120, the storage device 20 may generate multiple zones of a number within the calculated number of zones and may map a logical address of each zone to a physical address of at least one of the first storage areas. In this case, multiple zones may be generated in response to a request of the host 10.

In an embodiment, the memory controller 210 may generate multiple zones based on the type and locality of data to be written.

Here, the type of data to be written may include data to be written into a data block and a node to be written into a node block corresponding to the data block. The node may include information about a block of data. For example, the node may include a file name, a node identifier, a file size, and/or a logical address of the data block. The name of the file may mean the name of a file including data blocks, the node identifier may be a unique identifier for the node block, and the file size may mean the size of a file including data blocks. Moreover, each node block may refer to multiple data blocks.

In addition, the locality of data to be written may include temporal locality and spatial locality, where temporal locality indicates a property in which an accessed memory space is highly likely to be accessed again in the near future, and spatial locality indicates a property in which a memory space adjacent to the accessed memory space is highly likely to be accessed. In addition, a locality of data to be written may be referred to as a data temperature.

For example, data to be written based on data temperature may be classified into hot data, warm data, and cold data. Here, data temperatures may be considered in the order of hot data, warm data, and cold data. As used herein, hot data may refer to data that is accessed immediately upon being created, or data that is accessed very frequently. Warm data may refer to data that is accessed within a relatively short period of time after being created, or data that is accessed on a regular basis. Cold data may refer to data that has been created but that is accessed rarely or infrequently.

In addition, data to be written may be classified into hot data, hot node, warm data, warm node, cold data, and cold node based on data temperature and type of data.

In an embodiment, the memory controller 210 may generate a first zone corresponding to the hot data, a second zone corresponding to the hot nodes, a third zone corresponding to the warm data, a fourth zone corresponding to the warm nodes, a fifth zone corresponding to the cold data, and a sixth zone corresponding to the cold nodes. Here, each zone may be or include multiple zones, and for example, the number of first zones corresponding to the hot data may be greater than the number of fifth zones corresponding to the cold data.

In an embodiment, the memory controller 210 may generate zones where sizes of storage regions allocated to the zones corresponding to the hot data are greater than sizes of storage regions allocated to the zones corresponding to the cold data.

In addition, the storage device 20 may map a logical address of each zone to a physical address of at least one of the first storage areas.

In an embodiment, the memory controller 210 may map a logical address of each zone to a physical address of at least one of the SLC areas.

For example, referring to FIG. 9, the memory controller 210 may map one of the SLC areas of the non-volatile memory 220 to correspond to the first zone. Because the first zone corresponds to hot data, the SLC area may be referred to as a hot data SLC region 241. Similarly, the memory controller 210 may map each of the second to sixth zones to correspond to one of the other SLC areas of the non-volatile memory 220. The other SLC areas may be referred to as a hot node SLC region 242, a warm data SLC region 243, a warm node SLC region 244, a cold data SLC region 245, and a cold node SLC region 246.

Moreover, the storage device 20 may further include a device memory 230 that temporarily stores data to be written into the non-volatile memory 220.

In an embodiment, the device memory 230 may include buffer regions respectively corresponding to zones generated based on the type and locality of data to be written.

For example, referring to FIG. 9, the device memory 230 may include a hot data region 231, which is a buffer region corresponding to the first zone, a hot node region 232, which is a buffer region corresponding to the second zone, a warm data region 233, which is a buffer region corresponding to the third zone, a warm node region 234, which is a buffer region corresponding to the fourth zone, a cold data region 235, which is a buffer region corresponding to the fifth zone, and a cold node region 236, which is a buffer region corresponding to the sixth zone, without limitation thereto.

In addition, each of the buffer regions of the device memory 230 may correspond to some of the first storage areas of the non-volatile memory 220.

For example, the hot data region 231 of the device memory 230 may correspond to the hot data SLC region 241 of the non-volatile memory 220. In addition, the hot node region 232 of the device memory 230 may correspond to the hot node SLC region 242 of the non-volatile memory 220. The warm data region 233 of the device memory 230 may correspond to the warm data SLC region 243 of the non-volatile memory 220. The warm node region 234 of the device memory 230 may correspond to the warm node SLC region 244 of the non-volatile memory 220. The cold data region 235 of the device memory 230 may correspond to the cold data SLC region 245 of the non-volatile memory 220. The cold node region 235 of the device memory 230 may correspond to the cold node SLC region 245 of the non-volatile memory 220.

In operation S130, in response to the write request from the host 10, the storage device 20 may cause data included in the write request to be written into the first storage areas corresponding to the zone indicated by the write request.

The write request of the host 10 may include data to be written, as well as data temperature and type of the data to be written. The write request of the host 10 may be described in greater detail below with reference to FIGS. 10 and 12.

In an embodiment, the memory controller 210 may write data included in the first write request into the SLC area corresponding to the zone indicated by the first write request in response to the first write request of the host 10.

For example, when the data temperature of the data to be written is hot and the type of data is node, the memory controller 210 temporarily may store corresponding data into the hot node region 232 of the device memory and write corresponding data to the hot node SLC region 242 of the non-volatile memory 220 corresponding to the hot node region 232.

In addition, when the storage device 20 receives a write request for a new zone before the storage space of the specific buffer region of the device memory 230 is full, the storage device 20 may write data to be temporarily stored into a specific buffer region into an SLC area of the non-volatile memory 220 corresponding to the specific buffer region.

In an embodiment, the memory controller 210 may be configured to temporarily store data included in the first write request into a first buffer region of the device memory 230 corresponding to the first zone. Thereafter, when the memory controller 210 receives a second write request from the host, including data to be written into a second zone different from the first zone with remaining storage space in the first buffer region, data included in the first write request may be configured to be written into the SLC area corresponding to the first zone in response to the second write request of the host 10.

For example, it is assumed that the first buffer region and the second buffer region of the device memory 230 are warm data regions, the first buffer region and the second buffer region correspond to the first zone and the second zone, respectively, and the storage spaces of the first buffer region and the second buffer region are 112 KB. The memory controller 210 may temporarily store data included in the first write request of 56 KB into the first buffer region of the device memory 230 corresponding to the first zone. Thereafter, the memory controller 210 may receive a second write request from the host 10, including data to be written into a second zone different from the first zone. In this case, the memory controller 210 may write 56 KB of data temporarily stored in the first zone into the SLC area corresponding to the first zone in response to the second write request from the host 10.

In addition, the storage device 20 may be configured to migrate data stored in first storage areas corresponding to each zone to second storage areas. Here, the first storage areas may include single-level cells, and the second storage areas may include multi-level cells.

That is, the storage device 20 may perform an SLC buffering operation. The SLC buffering operation indicates an operation of preferentially writing data included in a write request into an SLC area among a series of operations of first writing the data included in the write request to the SLC area and later migrating the corresponding data to the MLC area.

The storage device 20 may divide data included in the write request in response to the write request of the host 10 to preferentially write the corresponding data into the SLC areas 241 to 246.

When a predetermined condition is satisfied, the storage device 20 may migrate data written into the SLC regions 241 to 246 to the TLC region 248. A case in which a predetermined condition is satisfied may include a case in which there is no SLC block available to be written into by the storage device 20 in response to a write request of the host 10. Moreover, another case in which a predetermined condition is satisfied may be where there is are fewer than a threshold number of SLC blocks available for writing.

In an embodiment, the memory controller 210 may be configured to migrate data stored in an SLC area corresponding to a specific zone to an MLC region. Here, the MLC region may include a TLC region or a QLC region.

According to an embodiment, the performance of the SLC write operation for the hot data may be optimized by adjusting the size of the SLC area based on the type and temperature of the data. In detail, by making the SLC area corresponding to hot data or warm data greater than the SLC area corresponding to cold data, performance of an SLC write operation for hot data or warm data may be optimized.

According to an embodiment, by allowing the host to adjust the size of the SLC region, predictable data management of the host is possible.

According to an embodiment, as the maximum number of open zones increases, multi-application performance of the storage device may be optimized.

In detail, up to two open zones could be provided to the host by calculating the number of open zones based on the buffer of the memory controller, but when the maximum number of open zones is calculated based on the size of the SLC area, multiple open zones may be provided to the host. In this way, the number of operations that may be simultaneously performed in the storage device may be optimized.

Figure 10:
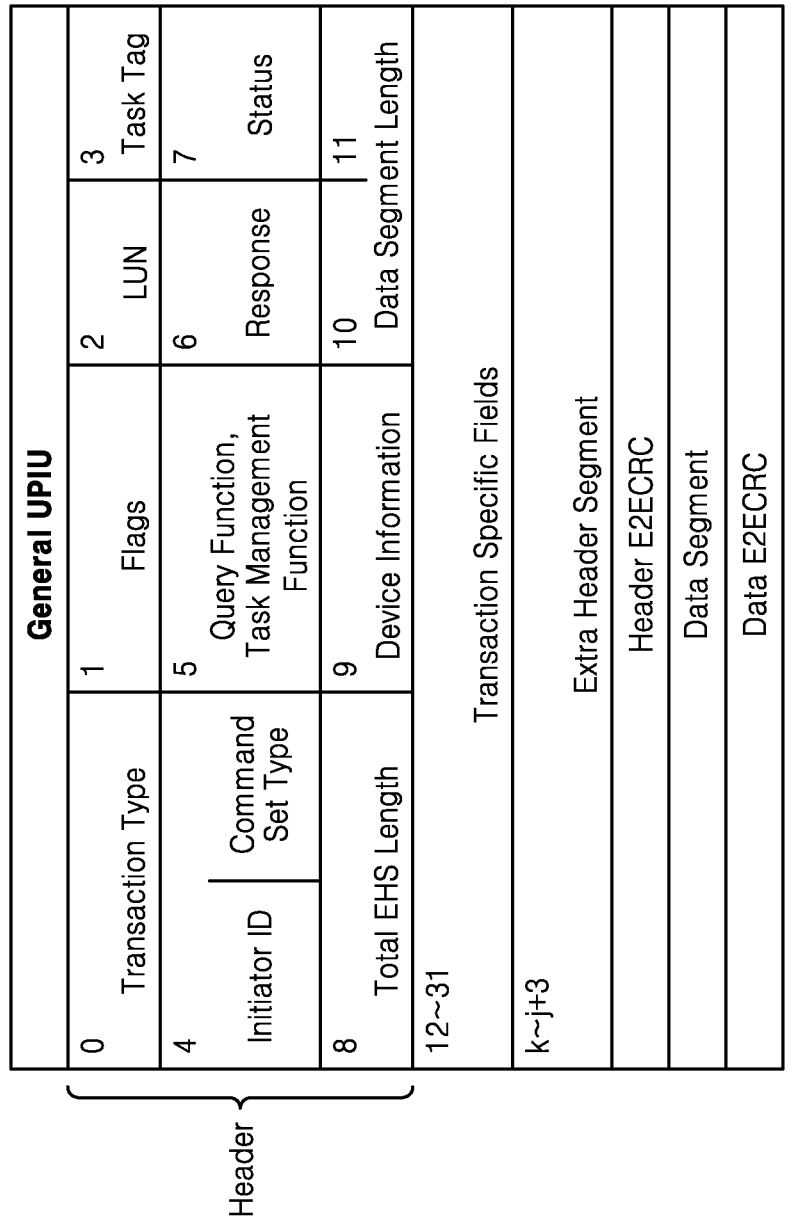
FIG. 10 is a data structure diagram for explaining the data structure of a general UPIU according to an embodiment.

FIG. 10 illustrates an example for explaining the data structure of a general UPIU according to an embodiment.

UFS protocol information units (UPIU) may represent commands or packets transmitted and/or received between a host and a storage device in a UFS device. The UPIU may be or include a command defined by the SCSI standard, but the UPIU may also be a command specific to the UFS standard.

As described in FIG. 8, a request from the host 10 for calculating the number of zones by the storage device 20 and a write request from the host may correspond to the UPIU.

In detail, referring to FIG. 10, the general UPIU may have a data structure including a transaction type field, a flags field, a logical unit number (LUN) field, a task tag field, initiator ID field, a command set type field, a query function, a task management function field, a response field, a status field, a total extra header segment (EHS) length field, a device information field, a data segment length field, which may hereafter be referred to as a header, transaction specific fields, an extra header segment field, a header end-to-end cyclic redundancy check (E2ECRC) field, a data segment field, and a data E2ECRC field. The length of the header may be 12 bytes, but is not limited thereto. The length of the UPIU may be a minimum of 32 bytes and a maximum of 65600 bytes, but is not limited thereto.

The transaction type field may indicate the type of request or response included in the data structure. In detail, the transaction type may include a transaction code, and the transaction code may define the content, function, or use of the UPIU. The flag field may have different values depending on the transaction type.

The LUN field may include the logical unit number within the target device for which the request is being served. The target device may be, for example, the storage device 20 of FIG. 1, and a storage region of the storage device 20 may match at least one logical unit number.

The task tag field may be a value corresponding to a task request, and may be a value that increases whenever a new task request is generated. When multiple UPIUs are generated for one task request, substantially all UPIUs may have the same task tag field value. For example, the task tag field may include 8 bits.

The command set type field may indicate a command set type associated with a command UPIU and a response UPIU. The command UPIU may be a UPIU provided by the host 10 to the storage device 20, and the response UPIU may be a UPIU provided by the storage device 20 to the host 10.

The query function and task management function field may be a field used in the query request UPIU and query response UPIU to define query functions, and may be a field used in the task management request UPIU to define task management functions.

When a response is requested from the storage device 20, the response field may indicate success or failure of the requested function.

The status field may include a SCSI status when the UPIU is a response UPIU.

A total EHS length field may indicate the length of an additional header segment in the UPIU. The length of the additional header segment may be a multiple of 4 bytes.

The device information field may provide information about the storage device 20, that is, device level information, within the response UPIU.

The data segment length field may indicate the number of valid bytes of the data segment in the UPIU.

A transaction specific field may be an additional field required by a specific transaction code.

The additional header segment field may be present when the total EHS length field has a value other than 0, and may have a length corresponding to a multiple of 4 bytes.

The data segment field may have a length corresponding to a multiple of 4 bytes and may include a data payload.

The header E2ECRC field may include CRC data for correcting errors in the header, and the data E2ECRC field may include CRC data for correcting errors in the data segment.

FIG. 11 illustrates a data structure of a query request UPIU according to an embodiment. FIG. 8 may be described with reference to FIG. 10.

As described in FIG. 8, the request of the host 10 to calculate the number of zones by the storage device 20 may correspond to the query request UPIU.

The query request UPIU may be a packet provided by the host 10 to the storage device 20. Referring to FIGS. 10 and 11, the transaction code of the query request UPIU may be xx01 0110b, but is not limited thereto.

The query function field of the query request UPIU may have a value representing a query request UPIU for defining a query function.

The SLC region length field of the query request UPIU may have a value for an SLC region length variable by the host 10. In detail, the SLC region length indicates the number of superblocks to be used as superblocks of the SLC region among multiple superblocks. For example, when the value of the SLC region length increases by 1, one super block may be further configured as the SLC region.

FIG. 12 illustrates a data structure of a write command UPIU according to an embodiment. FIG. 12 may be described in greater detail with reference to FIGS. 8 and 10.

The write request of the host 10 described in FIG. 8 may correspond to the write command UPIU.

A write request UPIU WRITE COMMAND may be a packet provided by the host 10 to the storage device 20.

The data temperature field of the write request UPIU may have a value indicating whether data to be written corresponds to hot data, hot node, warm data, warm node, cold data, or cold node. That is, the data temperature field of the write request UPIU WRITE COMMAND includes information about the data temperature and type of data to be written.

Figure 13:
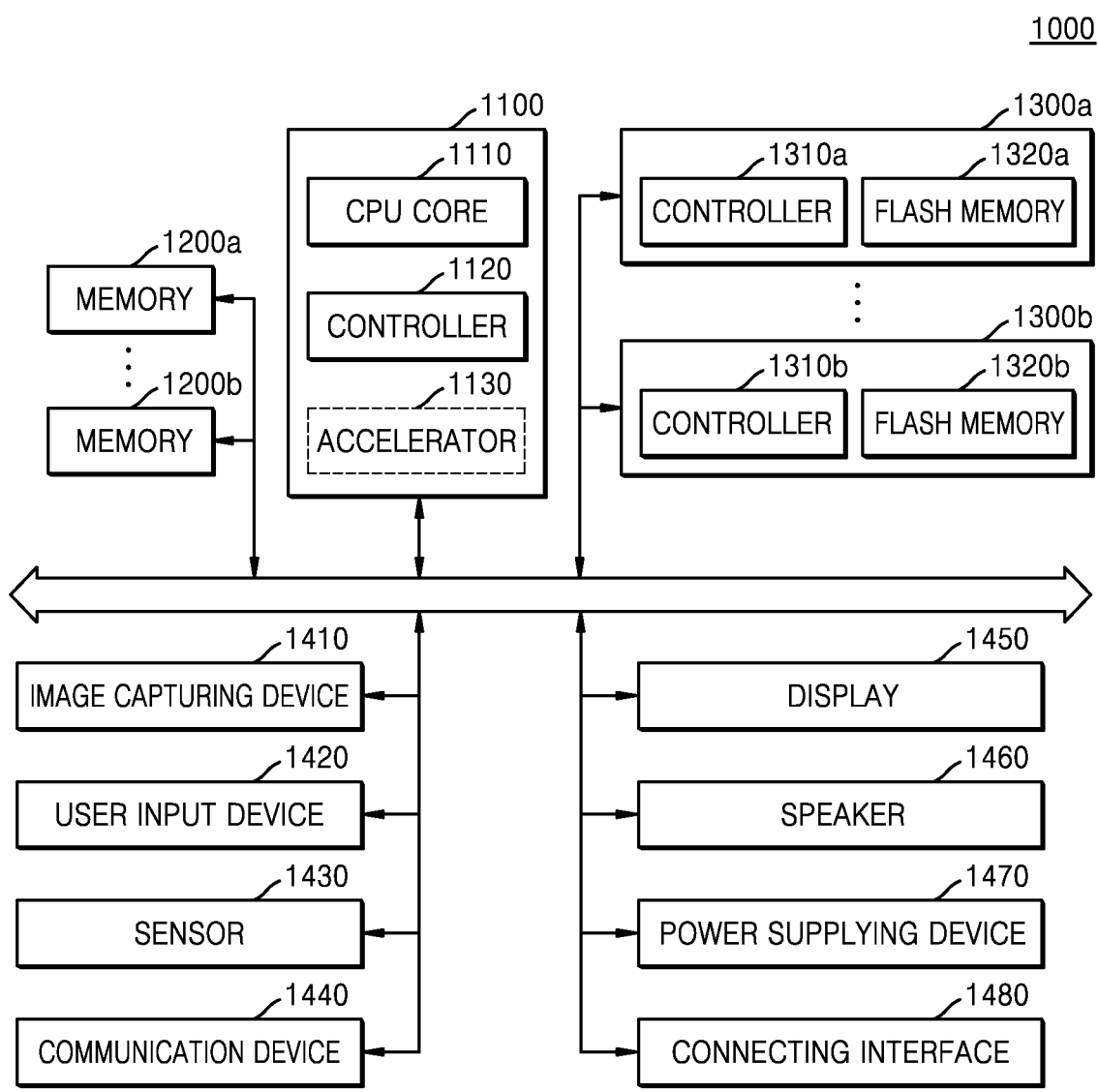
FIG. 13 is a block diagram illustrating a computing system according to an embodiment.

FIG. 13 illustrates a computing system 1000 according to an embodiment.

The computing system 1000 of FIG. 13 may be or include a mobile system such as a mobile phone, a smart phone, a tablet personal computer (PC), a wearable device, a healthcare device, or an internet of things (IoT) device. However, the computing system 1000 of FIG. 13 is not necessarily limited to a mobile system, and may be a personal computer, a laptop computer, a server, a media player, or an automotive device such as a navigation device. The computing system 1000 of FIG. 13 may include the storage system 1 of FIG. 1.

Referring to FIG. 13, the computing system 1000 may include a main processor 1100, memories 1200a and 1200b, and storage devices 1300a and 1300b, and may further include one or more of an image capturing device 1410, a user input device 1420, a sensor 1430, a communication device 1440, a display 1450, a speaker 1460, a power supplying device 1470, and a connecting interface 1480.

The main processor 1100 may control the overall operation of the computing system 1000, and more particularly, the operation of other components included in the computing system 1000. The main processor 1100 may be implemented using a general-purpose processor, a dedicated processor, or an application processor.

The main processor 1100 may include one or more CPU cores 1110 and may further include a controller 1120 for controlling the memories 1200a and 1200b and/or the storage devices 1300a and 1300b. Depending on an embodiment, the main processor 1100 may further include an accelerator block 1130 that is a dedicated circuit for high-speed data operations, such as artificial intelligence (AI) data operations. Such an accelerator block 1130 may include a graphics processing unit (GPU), a neural processing unit (NPU), and/or a data processing unit (DPU), and may be implemented as a separate chip physically independent of other components of the main processor 1100, without limitation thereto.

The memories 1200*a* and 1200*b* may be used as main memory devices of the computing system 1000, may include volatile memories such as SRAM and/or DRAM, and may also include non-volatile memories, such as flash memory, PRAM, and/or RRAM. The memories 1200*a* and 1200*b* may also be implemented in the same package as the main processor 1100. The host 10 of FIG. 1 may be implemented using the main processor 1100 and memories 1200*a* and 1200*b* of FIG. 13.

The storage devices 1300*a* and 1300*b* may serve as one or more non-volatile storage devices for storing data regardless of whether power is supplied or not, and may have a relatively large storage capacity compared to the memories 1200*a* and 1200*b*. The storage devices 1300*a* and 1300*b* may include storage controllers 1310*a* and 1310*b* and non-volatile memory (NVM) memories 1320*a* and 1320*b* that store data under the control of the storage controllers 1310*a* and 1310*b*. The non-volatile memories 1320*a* and 1320*b* may include a 2-dimensional 2-D) structure V-NAND flash memory or a 3-dimensional (3D) structure V-NAND flash memory, but may include other types of non-volatile memory, such as PRAM and/or RRAM.

The storage devices 1300*a* and 1300*b* may be included in the computing system 1000 while being physically separated from the main processor 1100 or may be implemented in the same package as the main processor 1100. In addition, the storage devices 1300*a* and 1300*b* may have a form, such as a solid-state device (SSD) or a memory card, and may be detachably coupled to other components of the computing system 1000 through an interface, such as a connection interface as may be described in greater detail below. The storage devices 1300*a* and 1300*b* may be devices to which standards are applied, such as universal flash storage (UFS), embedded multi-media card (eMMC), or non-volatile memory express (NVMe), but are not necessarily limited thereto. The storage system 1 of FIG. 1 may be included in at least one of the storage devices 1300*a* and 1300*b* of FIG. 13.

The photographing device 1410 may capture a still image or a video, and may be a camera, a camcorder, a borescope, a microscope, and/or a webcam.

The user input device 1420 may receive various types of data input from a user of the computing system 1000, and may be a touch pad, a keypad, a keyboard, a mouse, and/or a microphone.

The sensor 1430 may detect various types of physical quantities that may be obtained from the outside of the computing system 1000, and may convert the sensed physical quantities into electrical signals. Such a sensor 1430 may be a temperature sensor, a pressure sensor, an illuminance sensor, a position sensor, an acceleration sensor, a biosensor, and/or a gyroscope.

The communication device 1440 may transmit and receive signals between other devices outside the computing system 1000 based on various communication protocols. Such a communication device 1440 may be implemented by including an antenna, a transceiver, and/or a modulator and demodulator (MODEM).

The display 1450 and the speaker 1460 may serve as output devices that output visual information and auditory information to the user of the computing system 1000, respectively.

The power supply device 1470 may appropriately convert power supplied from a battery and/or an external power source connected or built into the computing system 1000 to supply the power to each component of the computing system 1000.

The connecting interface 1480 may provide a connection between the computing system 1000 and an external device, which, in turn, may be connected to the computing system 1000 and capable of exchanging data with the computing system 1000.

The connecting interface 1480 may be implemented in various interface methods such as advanced technology attachment (ATA), serial ATA (SATA), external SATA (eSATA), small computer small interface (SCSI), serial attached SCSI (SAS), peripheral component interconnection (PCI), PCI express (PCIe), NVM express (NVMe), IEEE 1394, universal serial bus (USB), secure digital (SD) card, multi-media card (MMC), embedded multi-media card (eMMC), universal flash storage (UFS), embedded universal flash storage (eUFS), and compact flash (CF) card interface.

Figure 14:
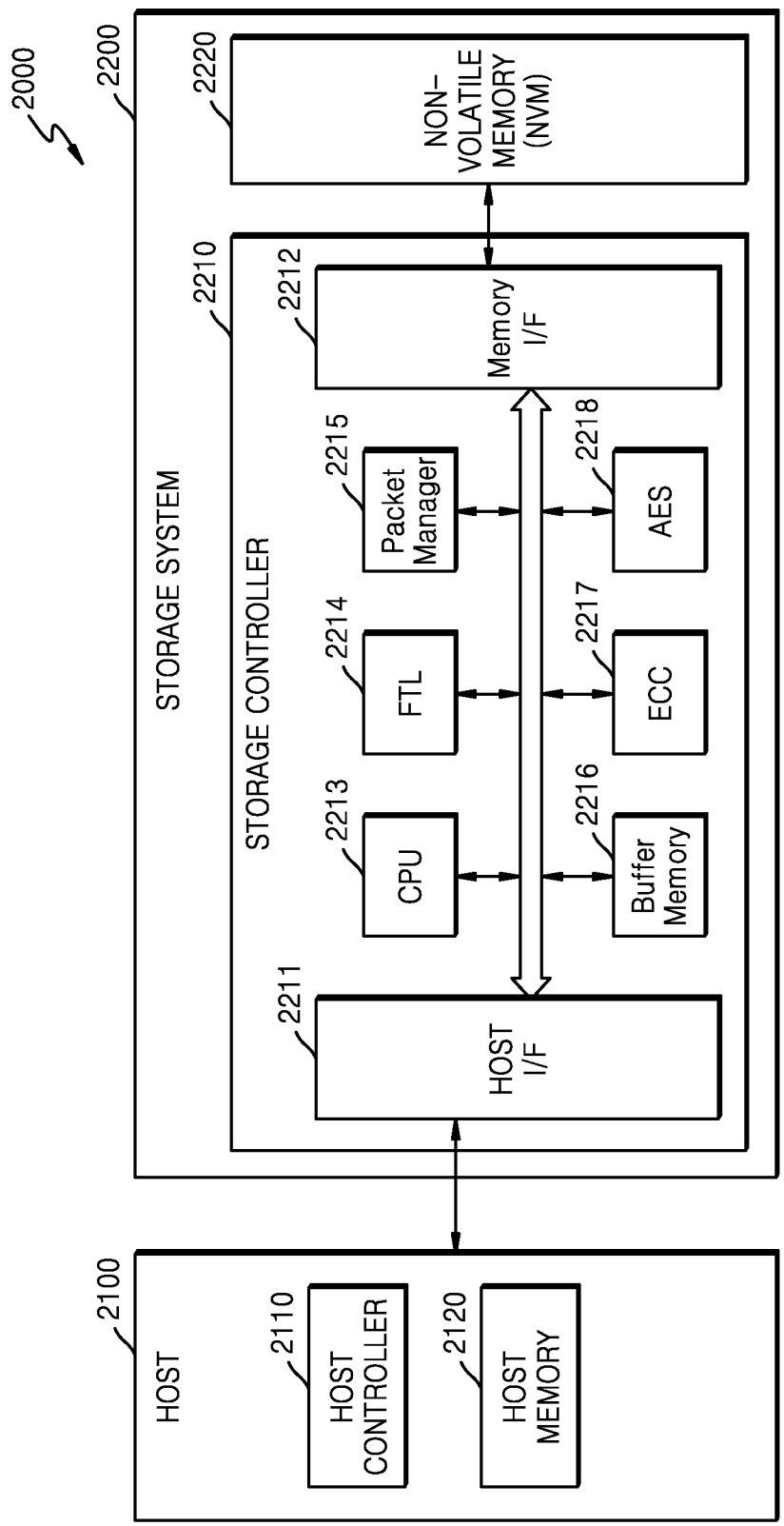
FIG. 14 is a block diagram illustrating a computing system according to an embodiment.

FIG. 14 illustrates a computing system 2000 according to an embodiment.

The computing system 2000 may include a host 2100 and a storage system 2200. In addition, the storage system 2200 may include a storage controller 2210 and a non-volatile memory (NVM) 2220. In addition, according to an embodiment, the host 2100 may include a host controller 2110 and a host memory 2120. The host memory 2120 may serve as a buffer memory for temporarily storing data to be transmitted to the storage system 2200 or data transmitted from the storage system 2200. The host 2100 may be an example of the host 10 of FIG. 1.

The storage system 2200 may include storage media for storing data in response to a request from the host 2100. For example, the storage system 2200 may include at least one of a solid-state drive (SSD), embedded memory, and removable external memory. When the storage system 2200 is the SSD, the storage system 2200 may be a device conforming to the non-volatile memory express (NVMe) standard. When the storage system 2200 is an embedded memory or an external memory, the storage system 2200 may be a device conforming to a universal flash storage (UFS) or an embedded multi-media card (eMMC) standard. The host 2100 and the storage system 2200 may generate and transmit packets based on each adopted standard protocol.

When a non-volatile memory 2220 of the storage system 2200 includes a flash memory, the flash memory may include a 2D NAND memory array or a 3D or vertical NAND (VNAND) memory array. As another example, the storage system 2200 may include other various types of non-volatile memories. For example, the storage system 2200 may include magnetic RAM (MRAM), spin-transfer torque MRAM, conductive bridging RAM (CBRAM), ferroelectric RAM (FeRAM), phase RAM (PRAM), resistive RAM, and other various types of memories, without limitation.

According to an embodiment, the host controller 2110 and the host memory 2120 may be implemented as separate semiconductor chips. Alternatively, in some an embodiment, the host controller 2110 and the host memory 2120 may be integrated into the same semiconductor chip. For example, the host controller 2110 may be any one of multiple modules included in an application processor, and the application processor may be implemented as a system on chip (SoC). In addition, the host memory 2120 may be an embedded memory included in the application processor, or may be a non-volatile memory or memory module disposed outside the application processor.

The host controller 2110 may store data, such as but not limited to write data, from the host memory 2120 into the non-volatile memory 2220, or may manage an operation of storing data, such as but not limited to read data, from the non-volatile memory 220 into the host memory 2120.

The storage controller 2210 may include a host interface 2211, a memory interface 2212, and a central processing unit (CPU) 2213. In addition, the storage controller 2210 may further include a flash translation layer (FTL) 2214, a packet manager 2215, a buffer memory 2216, an error correction code (ECC) engine 2217 for correctable and/or uncorrectable data errors, and an advanced encryption standard (AES) engine 2218. The storage controller 2210 may further include a working memory into which the FTL 2214 is loaded, and when the CPU 2211 executes the FTL 2214, operations of writing and reading data to and from the non-volatile memory may be controlled.

The host interface 2211 may transmit and receive packets to and from the host 2100.

A packet transmitted from the host 2100 to the host interface 2211 may include a command or data to be written into the non-volatile memory 2220, and a packet transmitted from the host interface 2211 to the host 2100 may include a response to a command or data read from the non-volatile memory 2220. The memory interface 2212 may transmit data to be written into the non-volatile memory 2220 to the non-volatile memory 2220 or receive data read from the non-volatile memory 2220. This memory interface 2212 may be implemented to comply with standard protocols such as Toggle or ONFI.

The FTL 2214 may perform several functions, such as address mapping, wear-leveling, and garbage collection. The address mapping operation is an operation of changing a logical address received from the host 2100 into a physical address used to actually store data in the non-volatile memory 2220.

The wear-leveling may be a technology for preventing excessive deterioration of a specific block by uniformly using blocks in the non-volatile memory 2220, and may be exemplarily implemented through a firmware technology that balances erase counts of physical blocks, without limitation thereto. The garbage collection is a technique for securing usable capacity in the non-volatile memory 2220 by copying valid data of a block to a new block and then erasing the old block.

The packet manager 2215 may generate a packet based on the protocol of the interface negotiated with the host 2100 or parse various information from the packet received from the host 2100. In addition, the buffer memory 2216 may temporarily store data to be written into the non-volatile memory 2220 or data to be read from the non-volatile memory 2220. The buffer memory 2216 may be included in the storage controller 2210, but may be disposed outside the storage controller 2210.

The ECC engine 2217 may perform error detection and correction functions for read data read from the non-volatile memory 2220. In greater detail, the ECC engine 2217 may generate parity bits for write data to be written into the non-volatile memory 2220, and the parity bits generated in this way may be stored in the non-volatile memory 2220 together with write data. When data is read from the non-volatile memory 2220, the ECC engine 2217 may detect and/or correct an error in the read data by using parity bits read from the non-volatile memory 2220 together with the read data, and may output the read data with the error corrected.

The AES engine 2218 may perform at least one of an encryption operation and a decryption operation on data input to the storage controller 2210 using a symmetric-key algorithm.

Figure 15:
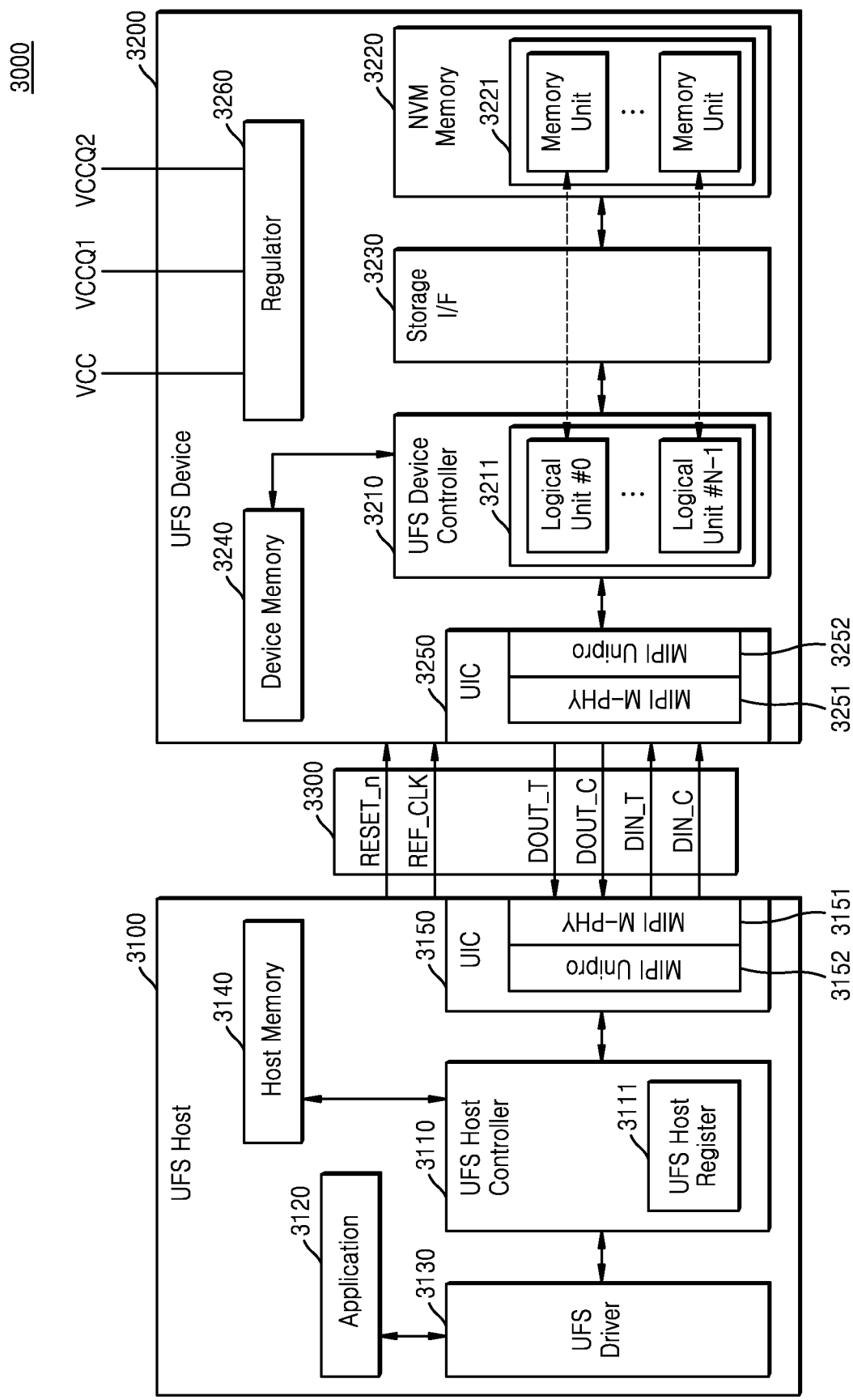
FIG. 15 is a block diagram for explaining a universal flash storage (UFS) system according to an embodiment.

FIG. 15 illustrates an example for explaining a UFS system 3000 according to an embodiment The UFS system 3000 is a system conforming to the UFS standard announced by the Joint Electronics Device Engineering Council (JEDEC), and may include a UFS host 3100, a UFS device 3200, and a UFS interface 3300. The above description of the storage system 1 of FIG. 1 may also be applied to the UFS system 3000 of FIG. 15 within a configurable range that does not conflict with the following description of FIG. 15. That is, the UFS host 3100 of FIG. 15 may include at least some components of the host 10 of FIG. 1, and the UFS device 3200 of FIG. 15 may include at least some components of the storage device 20 of FIG. 1.

Referring to FIG. 15, the UFS host 3100 and the UFS device 3200 may be interconnected through the UFS interface 3300. When the main processor of the host of FIG. 1 is an application processor, the UFS host 3100 may be implemented as a portion of the corresponding application processor. The UFS host controller 2110 and the host memory 3140 may respectively correspond to a controller and a memory of a main processor of the host 10 of FIG. 1. The UFS device 3200 may correspond to the storage devices 1300a and 1300b of FIG. 13, and the UFS device controller 3210 and the UFS device controller 3210 and the non-volatile memory 3220 may respectively correspond to the memory controller 210 and the non-volatile memory 220 of FIG. 1.

The UFS host 3100 may include a UFS host controller 3110, an application 3120, a UFS driver 3130, a host memory 3140, and a UFS interconnect (UIC) layer 3150. The UFS device 3200 may include a UFS device controller 3210, a non-volatile memory 3220, a storage interface 3230, a device memory 3240, a UIC layer 3250, and a regulator 3260. The non-volatile memory 3220 may be composed of multiple memory units 3221, and such a memory unit 3221 may include a 2D structure or a 3D structure V-NAND flash memory, and but may include other types of non-volatile memory, such as PRAM and/or RRAM. The UFS device controller 3210 and the non-volatile memory 3220 may be connected to each other through the storage interface 3230. The storage interface 3230 may be implemented to comply with standard protocols such as Toggle or ONFI.

The application 3120 may mean a program that wants to communicate with the UFS device 3200 in order to use the functions of the UFS device 3200. The application 3120 may transmit an input-output request (IOR) to the UFS driver 3130 for input and output (I/O) to the UFS device 3200. The I/O request (IOR) may mean a read request, a write request, and/or a discard request of data, but is not necessarily limited thereto.

The UFS driver 3130 may manage the UFS host controller 3110 through a host controller interface (UFS-HCI). The UFS driver 3130 may convert I/O requests generated by the application 3120 into UFS commands defined by the UFS standard, and transfer the converted UFS commands to the UFS host controller 3110. One I/O request may be translated into multiple UFS commands. The UFS commands may be or include commands defined by the SCSI standard, but may also be commands specific to the UFS standard.

The UFS host controller 3110 may transmit the UFS command converted by the UFS driver 3130 to the UIC layer 3250 of the UFS device 3200 through the UIC layer 3150 and the UFS interface 3300. In this process, the UFS host register 3111 of the UFS host controller 3110 may serve as a command queue (CQ).

The UIC layer 3150 of the UFS host 3100 may include MIPI M-PHY 3151 and MIPI Unipro 3152, and the UIC layer 3250 of the UFS device 3200 may similarly include MIPI M-PHY 3251 and MIPI Unipro 3252.

The UFS interface 3300 may include a line for transmitting a reference clock REF_CLK, a line for transmitting a hardware reset signal RESET_n for the UFS device 3200, a pair of lines for transmitting a pair of differential input signals DIN_t and DIN_c, and a pair of lines for transmitting a pair of differential output signals DOUT_t and DOUT_c.

For example, the frequency value of the reference clock provided from the UFS host 3100 to the UFS device 3200 may be one of four values of 19.2 MHz, 26 MHz, 38.4 MHz, and 52 MHz, but is not necessarily limited thereto. The UFS host 3100 may change the frequency value of the reference clock even during operation, that is, while data transmission and/or reception is being performed between the UFS host 3100 and the UFS device 3200. The UFS device 3200 may generate clocks of various frequencies from a reference clock provided from the UFS host 3100 using a phase-locked loop (PLL) or the like. In addition, the UFS host 3100 may set a data rate value between the UFS host 3100 and the UFS device 3200 through the frequency value of the reference clock. That is, the value of the data rate may be determined depending on the frequency value of the reference clock.

The UFS interface 3300 may support multiple lanes, and each lane may be implemented as a differential pair. For example, the UFS interface 3300 may include one or more receive lanes and one or more transmit lanes. In FIG. 15, a pair of lines transmitting a differential input signal pair DIN_T and DIN_C may be included in a reception lane, and a pair of lines transmitting a differential output signal pair DOUT_T and DOUT_C may be included in a transmission lane, respectively. Although one transmission lane and one reception lane are shown in FIG. 15, the number of transmission lanes and reception lanes may be changed.

The receive lane and the transmit lane may transmit data in a serial communication method, and full-duplex communication between the UFS host 3100 and the UFS device 3200 is possible due to the structure in which the reception lane and the transmission lane are separated. That is, the UFS device 3200 may transmit data to the UFS host 3100 through a transmit lane while receiving data from the UFS host 3100 through a receive lane. In addition, control data, such as commands from the UFS host 3100 to the UFS device 3200 and user data that the UFS host 3100 intends to store in or read from the non-volatile memory 3220 of the UFS device 3200 may be transmitted through the same lane. Accordingly, between the UFS host 3100 and the UFS device 3200, a separate lane need not be provided for data transmission, other than a pair of reception lanes and a pair of transmission lanes.

The UFS device controller 3210 of the UFS device 3200 may control overall operations of the UFS device 3200. The UFS device controller 3210 may manage the non-volatile memory 3220 through a logical unit (LU) 3211 that is a logical data storage unit. The number of LUs 3211 may be 8, but is not limited thereto. The LU 3211 may be referred to as a storage region. The UFS device controller 3210 may include an FTL, and may convert a logical data address transmitted from the UFS host 3100, for example, a logical block address (LBA), into a physical data address, for example, a physical block address (PBA), by using address mapping information of the FTL. A logical block for storing user data in the UFS system 3000 may have a size within a predetermined range. For example, the minimum size of a logical block may be set to 4 Kbyte.

When a command from the UFS host 3100 is input to the UFS device 3200 through the UIC layer 3250, the UFS device controller 3210 may perform an operation based on the input command, and when the operation is completed, a completion response may be transmitted to the UFS host 3100.

As an example, when the UFS host 3100 intends to store user data in the UFS device 3200, the UFS host 3100 may transmit a data storage command to the UFS device 3200. Upon receiving a response ready-to-transfer indicating that the user data is ready to be transferred is received from the UFS device 3200, the UFS host 3100 may transmit the user data to the UFS device 3200. The UFS device controller 3210 may temporarily store the transmitted user data in the device memory 3240 and store the user data temporarily stored in the device memory 3240 in a selected location of the non-volatile memory 3220 based on the address mapping information of the FTL.

As another example, when the UFS host 3100 intends to read user data stored in the UFS device 3200, the UFS host 3100 may transmit a data read command to the UFS device 3200. Upon receiving the command, the UFS device controller 3210 may read user data from the non-volatile memory 3220 based on the data read command and temporarily store the read user data in the device memory 3240. During this reading process, the UFS device controller 3210 may detect and correct errors in the read user data using a built-in error correction code (ECC) engine. In greater detail, the ECC engine may generate parity bits for write data to be written into the non-volatile memory 3220, and the parity bits generated in this way may be stored in the non-volatile memory 3220 together with the write data. When data is read from the non-volatile memory 3220, the ECC engine may correct an error of the read data using parity bits read from the non-volatile memory 3220 together with the read data and output the read data with the error corrected.

In addition, the UFS device controller 3210 may transmit user data temporarily stored in the device memory 3240 to the UFS host 3100. In addition, the UFS device controller 3210 may further include an advanced encryption standard (AES) engine. The AES engine may perform at least one of an encryption operation and a decryption operation on data input to the UFS device controller 3210 using a symmetric-key algorithm.

The UFS host 3100 may store commands to be transmitted to the UFS device 3200 in order in the UFS host register 3111, which may serve as a command queue, and transmit commands to the UFS device 3200 in the above order. In this case, the UFS host 3100 may send the next command queued in the command queue to the UFS device 3200 even while the previously sent command is still being processed by the UFS device 3200, that is, even before the host 3100 receives notification that a previously sent command has been processed by the UFS device 3200, and thus the UFS device 3200 may also receive the next command from the UFS host 3200 while processing the previously sent command. The maximum number of commands or queue depth that may be stored in such a command queue may be, for example, 32. In addition, the command queue may be implemented as a circular queue type that indicates the beginning and end of a sequence of commands stored in the queue through a head pointer and a tail pointer, respectively.

Each of the multiple memory units 3221 may include a memory cell array and a control circuit that controls an operation of the memory cell array. The memory cell array may include a 2D memory cell array or a 3D memory cell array. The memory cell array may include multiple memory cells, and each memory cell may be an SLC that stores 1 bit of information, or may be a cell that stores two or more bits of information, such as MLC, TLC, and QLC. The 3D memory cell array may include vertical NAND strings that are vertically oriented where at least one memory cell is located on top of another memory cell.

VCC, VCCQ, VCCQ2, and the like may be input to the UFS device 3200 as power supply voltages. The VCC is a main power supply voltage for the UFS device 3200 and may have a value of about 2.4 V to about 3.6 V. The VCCQ is a power supply voltage for supplying a low-range voltage, mainly for the UFS device controller 3210, and may have a value of about 1.14 V to about 1.26 V. The VCCQ2 is a power supply voltage for supplying a voltage lower than VCC but higher than VCCQ, is mainly for I/O interfaces, such as MIPI M-PHY 3251, and may have a value of about 1.7 V to about 1.95 V. The power supply voltages may be supplied to each component of the UFS device 3200 through the regulator 3260. The regulator 3260 may be implemented as a set of unit regulators each connected to different voltages among the aforementioned power supply voltages.

Figure 16:
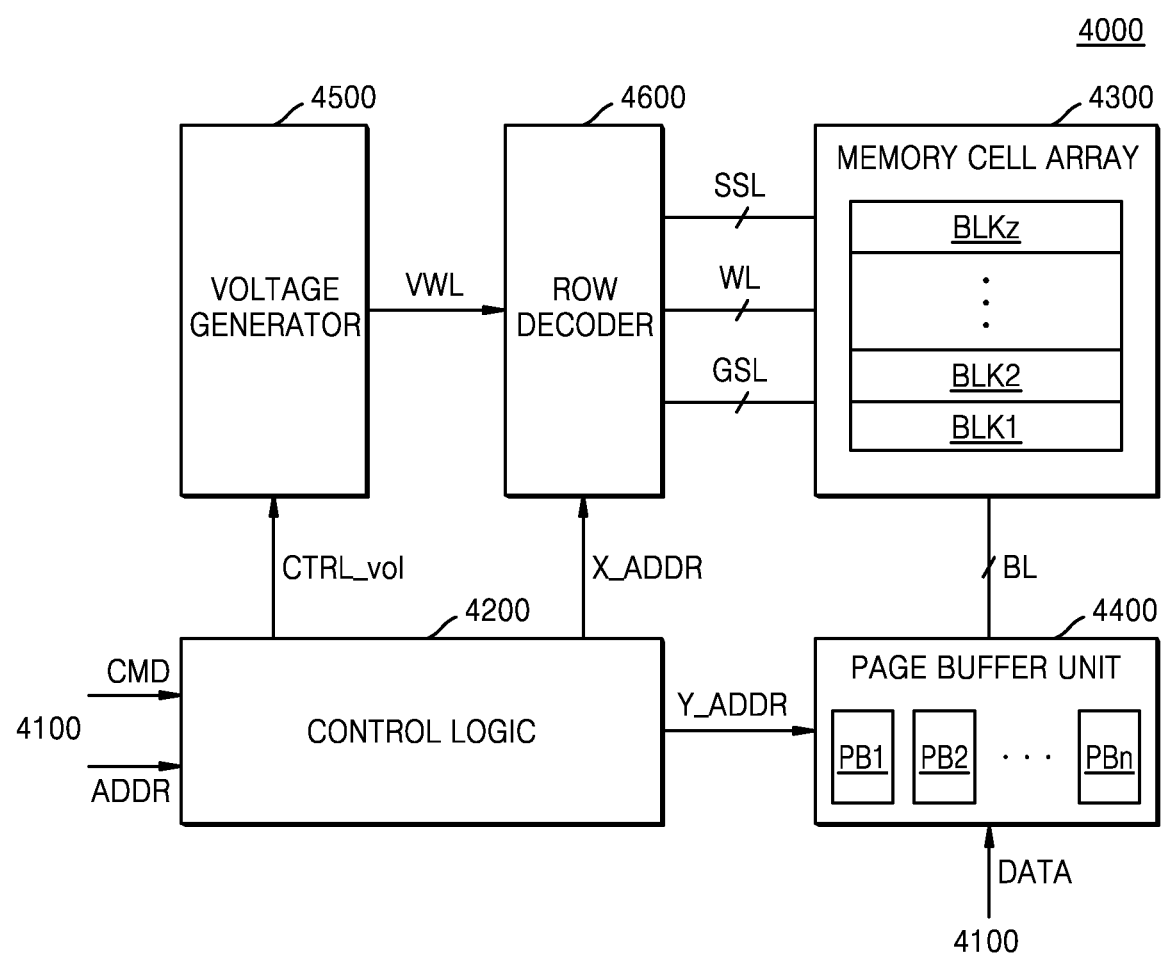
FIG. 16 is a block diagram illustrating an example of the non-volatile memory of FIG. 1.

FIG. 16 illustrates an example of a non-volatile memory 220 of FIG. 1

The non-volatile memory 220 of FIG. 1 may be embodied in a memory device 4000. Referring to FIG. 16, the memory device 4000 may include a control logic circuit 4200, a memory cell array 4300, a page buffer unit 4400, a voltage generator 4500, and a row decoder 4600. The memory device 4000 may further include column logic, a pre-decoder, a temperature sensor, a command decoder, an address decoder, and the like.

The control logic circuit 4200 may overall control various operations within the memory device 4000. The control logic circuit 4200 may output various control signals in response to the command CMD and/or the address ADDR from the memory interface circuit 4100. For example, the control logic circuit 4200 may output a voltage control signal CTRL_vol, a row address X-ADDR, and a column address Y-ADDR.

The memory cell array 4300 may include multiple memory blocks BLK1 to BLKz, where z is a positive integer, and each of the multiple memory blocks BLK1 to BLKz may include multiple memory cells. The memory cell array 4300 may be connected to the page buffer unit 4400 through bit-lines BL, and may be connected to the row decoder 4600 through word-lines WL, string-selection lines SSL, and ground-selection lines GSL.

In an embodiment, the memory cell array 4300 may include a 3D memory cell array, and the 3D memory cell array may include multiple NAND strings. Each NAND string may include memory cells respectively connected to word-lines vertically stacked on a substrate. In an embodiment, the memory cell array 4300 may include a two-dimensional memory cell array, and the 2D memory cell array may include multiple NAND strings disposed in row and column directions.

The page buffer unit 4400 may include multiple page buffers PB1 to PBn, where n is an integer greater than or equal to 3, and the multiple page buffers PB1 to PBn may be respectively connected to memory cells through multiple bit-lines BL. The page buffer unit 4400 may select at least one bit-line from among the bit-lines BL in response to the column address Y-ADDR. The page buffer unit 4400 may operate as a write driver or a sense amplifier based on an operation mode. For example, during a program operation, the page buffer unit 4400 may apply a bit-line voltage corresponding to data to be programmed to the selected bit-line. During a read operation, the page buffer unit 4400 may detect data stored in a memory cell by sensing a current or voltage of a selected bit-line.

The voltage generator 4500 may generate various types of voltages for performing program, read, and erase operations based on the voltage control signal CTRL_vol. For example, the voltage generator 4500 may generate a program voltage, a read voltage, a program verify voltage, an erase voltage, and the like as the word-line voltage VWL.

The row decoder 4600 may select one of the multiple word-lines WL and select one of the multiple string-selection lines SSL in response to the row address X-ADDR. For example, the row decoder 4600 may apply a program voltage and a program verify voltage to the selected word-line during a program operation, and may apply a read voltage to the selected word-line during a read operation.

Figure 17:
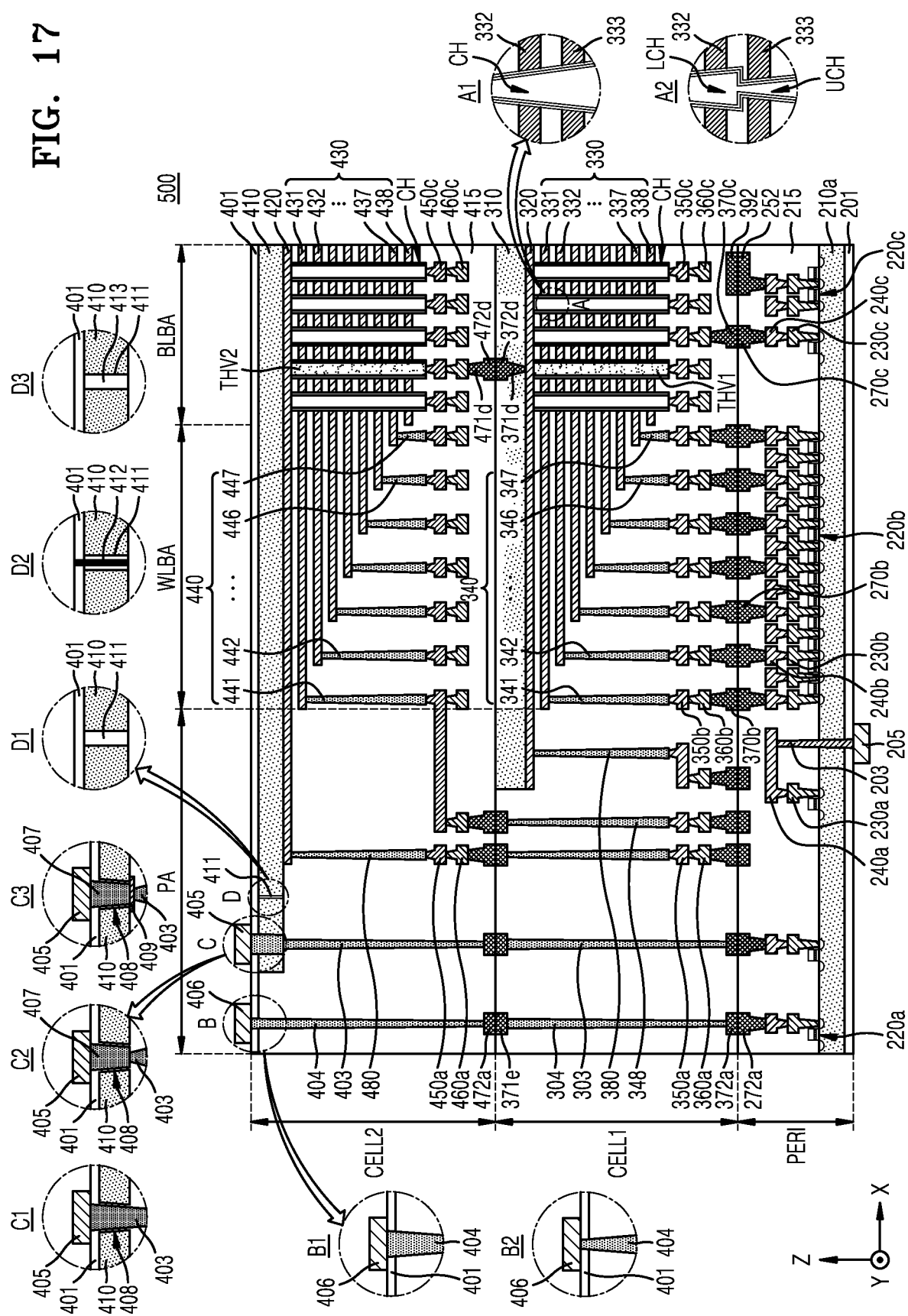
FIG. 17 is a cross-sectional view diagram of a non-volatile memory having a bonding vertical NAND (B-VNAND) structure according to an embodiment.

FIG. 17 illustrates a non-volatile memory 500 having a bonding vertical NAND (B-VNAND) structure according to an embodiment.

Referring to FIG. 17, the non-volatile memory 500 may have a chip to chip (C2C) structure. Here, the C2C structure may refer to fabricating at least one upper chip including the cell region CELL and a lower chip including the peripheral circuit region PERI, respectively, and then connecting the at least one upper chip and the lower chip to each other by a bonding method. For example, the bonding method may refer to a method of electrically or physically connecting a bonding metal pattern formed on an uppermost metal layer of an upper chip and a bonding metal pattern formed on an uppermost metal layer of a lower chip to each other. For example, when the bonding metal patterns are formed of copper (Cu), the bonding method may be a Cu—Cu bonding method. As another example, the bonding metal patterns may also be formed of aluminum (Al) or tungsten (W).

The non-volatile memory 500 may include at least one upper chip including a cell region. For example, as shown in FIG. 17, the non-volatile memory 500 may be implemented to include two upper chips. However, this is an example, and the number of upper chips is not limited thereto. When the non-volatile memory 500 is implemented to include two upper chips, after the first upper chip including the first cell region CELL1, the second upper chip including the second cell region CELL2, and the lower chip including the peripheral circuit region PERI are manufactured, respectively, the non-volatile memory 500 may be manufactured by connecting the first upper chip, the second upper chip, and the lower chip to each other by a bonding method. The first upper chip may be reversed and connected to the lower chip by bonding, and the second upper chip may also be reversed and connected to the first upper chip by bonding. In the following description, upper and lower portions of the first and second upper chips are defined based on before the first upper chip and the second upper chip are reversed. That is, in FIG. 17, the upper part of the lower chip means the upper part defined based on the +Z-axis direction, and the upper part of each of the first and second upper chips means the upper part defined based on the −Z-axis direction. However, this is an example, and alternatively one of the first upper chip or the second upper chip may be reversed and connected by a bonding method.

Each of the peripheral circuit region PERI and the first and second cell regions CELL1 and CELL2 of the non-volatile memory 500 may include an external pad bonding region PA, a word-line bonding region WLBA, and a bit-line bonding area BLBA.

The peripheral circuit region PERI may include a first substrate 210a and multiple circuit elements 220a, 220b, and 220c formed on the first substrate 210a. An interlayer insulating layer 215 including one or more insulating layers may be provided on the multiple circuit elements 220a, 220b, and 220c, and multiple metal wires connected to the multiple circuit elements 220a, 220b, and 220c may be provided in the interlayer insulating layer 215. For example, the multiple metal wires may include first metal wires 230a, 230b, and 230c connected to each of the multiple circuit elements 220a, 220b, and 220c, and second metal wires 240a, 240b, and 240c formed on the first metal wires 230a, 230b, and 230c. The multiple metal wires may be formed of at least one of various conductive materials. For example, the first metal wires 230a, 230b, and 230c may be formed of tungsten having a relatively high electrical resistivity, and the second metal wires 240a, 240b, and 240c may be formed of copper having a relatively low electrical resistivity.

Although the first metal wires 230a, 230b, and 230c and the second metal wires 240a, 240b, and 240c are shown and described, an embodiment are not limited thereto. At least one additional metal wire may be further formed on the second metal wires 240a, 240b, and 240c. In this case, the second metal wires 240a, 240b, and 240c may be formed of aluminum. In addition, at least some of the additional metal wires formed on the second metal wires 240a, 240b, and 240c may be formed of copper having a lower electrical resistivity than aluminum of the second metal wires 240a, 240b, and 240c.

The interlayer insulating layer 215 may be disposed on the first substrate 210a and may include an insulating material, such as silicon oxide or silicon nitride.

Each of the first and second cell regions CELL1 and CELL2 may include at least one memory block. The first cell region CELL1 may include the second substrate 310 and the common source line 320. Multiple word-lines 331 to 338 330 may be stacked on the second substrate 310 in a direction, such as a Z-axis direction, perpendicular to the upper surface of the second substrate 310. String-selection lines and ground-selection lines may be disposed above and below the word-lines 330, and multiple word-lines 330 may be disposed between the string-selection lines and the ground-select line. Similarly, the second cell region CELL2 may include the third substrate 410 and the common source line 420, and multiple word-lines 431 to 438, collectively 430, may be stacked in a direction perpendicular to the upper surface of the third substrate 410, such as the Z-axis direction. The second substrate 310 and the third substrate 410 may be made of various materials, and may be, for example, a silicon substrate, a silicon-germanium substrate, a germanium substrate, or a monocrystalline epitaxy grown on a monocrystalline silicon substrate. Multiple channel structures CH may be formed in each of the first and second cell regions CELL1 and CELL2.

In an embodiment, as shown in A1, the channel structure CH is provided in the bit-line bonding area BLBA and extends in a direction perpendicular to the upper surface of the second substrate 310 to pass through the word-lines 330, the string-selection lines, and the ground-selection line. The channel structure CH may include a data storage layer, a channel layer, and a buried insulating layer. The channel layer may be electrically connected to the first metal wiring 350c and the second metal wiring 360c in the bit-line bonding area BLBA. For example, the second metal wiring 360c may be a bit-line and may be connected to the channel structure CH through the first metal wiring 350c. The bit-line 360c may extend in a first direction, such as a Y-axis direction, parallel to the upper surface of the second substrate 310.

In an embodiment, as shown in A2, the channel structure CH may include a lower channel LCH and an upper channel UCH connected to each other. For example, the channel structure CH may be formed through a process for the lower channel LCH and a process for the upper channel UCH. The lower channel LCH may extend in a direction perpendicular to the upper surface of the second substrate 310 and pass through the common source line 320 and the lower word-lines 331 and 332. The lower channel LCH may include a data storage layer, a channel layer, and a buried insulating layer, and may be connected to the upper channel UCH. The upper channel UCH may pass through upper word-lines 333 to 338. The upper channel UCH may include a data storage layer, a channel layer, a buried insulating layer, and the like, and the channel layer of the upper channel UCH may be electrically connected to the first metal wire 350c and the second metal wire 360c. As the length of the channel increases, it may be difficult to form a channel having a constant width due to process reasons. The non-volatile memory 500 according to an embodiment may include a channel having optimized width uniformity through a lower channel LCH and an upper channel UCH formed through a sequential process.

As shown in A2, when the channel structure CH is formed to include a lower channel LCH and an upper channel UCH, a word-line positioned near a boundary between the lower channel LCH and the upper channel UCH may be a dummy word-line. For example, the word-line 332 and word-line 333 forming a boundary between the lower channel LCH and the upper channel UCH may be dummy word-lines. In this case, data may not be stored in memory cells connected to the dummy word-line. Alternatively, the number of pages corresponding to memory cells connected to a dummy word-line may be less than the number of pages corresponding to memory cells connected to a general word-line. The voltage level applied to the dummy word-line may be different from the voltage level applied to the general word-line, and thus, the influence of the non-uniform channel width between the lower channel LCH and the upper channel UCH on the operation of the memory device may be reduced.

Moreover, in A2, it is illustrated that the number of lower word-lines 331 and 332 through which the lower channel LCH passes is less than the number of upper word-lines 333 to 338 through which the upper channel UCH passes. However, this is an example, and the present invention is not limited thereto. As another example, the number of lower word-lines through which the lower channel LCH passes may be equal to or greater than the number of upper word-lines through which the upper channel UCH passes. In addition, the structure and connection relationship of the channel structure CH disposed in the first cell region CELL1 described above may be equally applied to the channel structure CH disposed in the second cell region CELL2.

In the bit-line bonding area BLBA, the first through electrode THV1 may be provided in the first cell region CELL1, and the second through electrode THV2 may be provided in the second cell region CELL2. As shown in FIG. 17, the first through electrode THV1 may pass through the common source line 320 and the multiple word-lines 330. However, this is an example, and the first through electrode THV1 may further penetrate the second substrate 310. The first through electrode THV1 may include a conductive material. Alternatively, the first through electrode THV1 may include a conductive material surrounded by an insulating material. The second through electrode THV2 may also be provided in the same shape and structure as the first through electrode THV1.

In an embodiment, the first through electrode THV1 and the second through electrode THV2 may be electrically connected to each other through a first through metal pattern 372d and a second through metal pattern 472d. The first through metal pattern 372d may be formed on a lower side of the first upper chip including the first cell region CELL1; and the second through metal pattern 472d may be formed on an upper side of the second upper chip, including the second cell region CELL2. The first through electrode THV1 may be electrically connected to the first metal wire 350c and the second metal wire 360c. A lower via 371d may be formed between the first through electrode THV1 and the first through metal pattern 372d, and an upper via 471d may be formed between the second through electrode THV2 and the second through metal pattern 472d. The first through metal pattern 372d and the second through metal pattern 472d may be connected to each other by a bonding method.

In addition, in the bit-line bonding area BLBA, an upper metal pattern 252 may be formed on the uppermost metal layer of the peripheral circuit region PERI, and an upper metal pattern 392 having the same shape as the upper metal pattern 252 may be formed on the uppermost metal layer of the first cell region CELL1. The upper metal pattern 392 of the first cell region CELL1 and the upper metal pattern 252 of the peripheral circuit region PERI may be electrically connected to each other by the bonding method. In the bit-line bonding area BLBA, the bit-line 360c may be electrically connected to a page buffer included in the peripheral circuit region PERI. For example, some of the circuit elements 220c of the peripheral circuit region PERI may provide a page buffer, and the bit-lines 360c may be electrically connected to the circuit elements 220c providing the page buffer through the upper bonding metal 370c of the first cell region CELL1 and the upper bonding metal 270c of the peripheral circuit region PERI.

Continuing to refer to FIG. 17, in the word-line bonding area WLBA, the word-lines 330 of the first cell region CELL1 may extend in a second direction, such as an X-axis direction, parallel to the upper surface of the second substrate 310 and may be connected to multiple cell contact plugs 341 to 347, collectively 340. A first metal wire 350b and a second metal wire 360b may be sequentially connected to upper portions of the cell contact plugs 340 connected to the word-lines 330. The cell contact plugs 340 may be connected to the peripheral circuit region PERI through the upper bonding metal 370b of the first cell region CELL1 and the upper bonding metal 270b of the peripheral circuit region PERI in the word-line bonding area WLBA.

The cell contact plugs 340 may be electrically connected to a row decoder included in the peripheral circuit region PERI. For example, some of the circuit elements 220b of the peripheral circuit region PERI provide a row decoder, and the cell contact plugs 340 may be electrically connected to the circuit elements 220b providing the row decoder through the upper bonding metal 370b of the first cell region CELL1 and the upper bonding metal 270b of the peripheral circuit region PERI. In an embodiment, operating voltages of the circuit elements 220b providing the row decoder may be different from operating voltages of the circuit elements 220c providing the page buffer. For example, operating voltages of the circuit elements 220c providing the page buffer may be greater than operating voltages of the circuit elements 220b providing the row decoder.

Similarly, in the word-line bonding region WLBA, the word-lines 430 of the second cell region CELL2 may extend in a second direction, such as the X-axis direction, parallel to the upper surface of the third substrate 410 and may be connected to the multiple cell contact plugs 441 to 447, collectively 440. The cell contact plugs 440 may be connected to the peripheral circuit region PERI through the upper metal pattern of the second cell region CELL2, the lower and upper metal patterns of the first cell region CELL1, and the cell contact plug 348.

In the word-line bonding region WLBA, an upper bonding metal 370b may be formed in the first cell region CELL1 and an upper bonding metal 270b may be formed in the peripheral circuit region PERI. The upper bonding metal 370b of the first cell region CELL1 and the upper bonding metal 270b of the peripheral circuit region PERI may be electrically connected to each other by the bonding method. The upper bonding metal 370b and the upper bonding metal 270b may be formed of aluminum, copper, or tungsten.

In the external pad bonding region PA, a lower metal pattern 371e may be formed in the first cell region CELL1 below the second cell region CELL2, and an upper metal pattern 472a may be formed in the second cell region CELL2. The lower metal pattern 371e of the first cell region CELL1 and the upper metal pattern 472a of the second cell region CELL2 may be connected to each other by the bonding method in the external pad bonding region PA. Similarly, an upper metal pattern 372a may be formed on the first cell region CELL1, and a lower metal pattern 272a may be formed on the peripheral circuit region PERI. The upper metal pattern 372a of the first cell region CELL1 and the lower metal pattern 272a of the peripheral circuit region PERI may be connected to each other by the bonding method.

Common source line contact plugs 380 and 480 may be disposed in the external pad bonding region PA. The common source line contact plugs 380 and 480 may be formed of a conductive material, such as metal, metal compound, or doped polysilicon. The common source line contact plug 380 of the first cell region CELL1 may be electrically connected to the common source line 320, and the common source line contact plug 480 of the second cell region CELL2 may be electrically connected to the common source line 420. A first metal wire 350a and a second metal wire 360a may be sequentially stacked on the common source line contact plug 380 of the first cell region CELL1, and a first metal wire 450a and a second metal wire 460a may be sequentially stacked on the common source line contact plug 480 of the second cell region CELL2.

I/O pads 205, 405, and 406 may be disposed in the external pad bonding region PA. Referring to FIG. 17, a lower insulating layer 201 may cover the lower surface of the first substrate 210a, and first I/O pads 205 may be formed on the lower insulating layer 201. The first I/O pad 205 may be connected to at least one of the multiple circuit elements 220a disposed in the peripheral circuit region PERI through the first I/O contact plug 203 and may be separated from the first substrate 210a by the lower insulating layer 201. In addition, a side insulating layer may be disposed between the first I/O contact plug 203 and the first substrate 210a to electrically separate the first I/O contact plug 203 from the first substrate 210a.

An upper insulating layer 401 covering the upper surface of the third substrate 410 may be formed on the third substrate 410. A second I/O pad 405 and/or a third I/O pad 406 may be disposed on the upper insulating layer 401. The second I/O pad 405 may be connected to at least one of the multiple circuit elements 220a disposed in the peripheral circuit region PERI through the second I/O contact plugs 403 and 303, and the third I/O pad 406 may be connected to at least one of the multiple circuit elements 220a disposed in the peripheral circuit region PERI through the third I/O contact plugs 404 and 304.

In an embodiment, the third substrate 410 may not be disposed in the region where the I/O contact plugs are disposed. For example, as shown in B, the third I/O contact plug 404 may be separated from the third substrate 410 in a direction parallel to the upper surface of the third substrate 410 and may be connected to the third I/O pad 406 through the interlayer insulating layer 415 of the second cell region CELL2. In this case, the third I/O contact plug 404 may be formed through various processes.

Illustratively, as shown in B1, the third I/O contact plug 404 may extend in a third direction, such as the Z-axis direction, and may be formed where a diameter of the third I/O contact plug 404 increases toward the upper insulating layer 401. That is, while the diameter of the channel structure CH described in A1 is formed to decrease toward the upper insulating layer 401, the diameter of the third I/O contact plug 404 may be formed to increase toward the upper insulating layer 401. For example, the third I/O contact plug 404 may be formed after the second cell region CELL2 and the first cell region CELL1 are coupled to each other by the bonding method.

In addition, as shown in B2, the third I/O contact plug 404 may extend in a third direction, such as the Z-axis direction, and may have a smaller diameter toward the upper insulating layer 401. That is, similar to the channel structure CH, the diameter of the third I/O contact plug 404 may be formed to decrease toward the upper insulating layer 401. For example, the third I/O contact plug 404 may be formed together with the cell contact plugs 440 before the second cell region CELL2 and the first cell region CELL1 are bonded together.

In an embodiment, the I/O contact plugs may be disposed to overlap the third substrate 410. For example, as shown in C, the second I/O contact plug 403 is formed to penetrate the interlayer insulating layer 415 of the second cell region CELL2 in a third direction, such as the Z-axis direction, and may be electrically connected to the second I/O pad 405 through the third substrate 410. In this case, a connection structure between the second I/O contact plug 403 and the second I/O pad 405 may be implemented in various ways.

As shown in C1, an opening 408 penetrating the third substrate 410 is formed, and the second I/O contact plug 403 may be directly connected to the second I/O pad 405 through the opening 408 formed in the third substrate 410. In this case, as shown in C1, the diameter of the second I/O contact plug 403 may increase toward the second I/O pad 405. However, this is an example, and the diameter of the second I/O contact plug 403 may be formed to decrease as the second I/O contact plug 403 goes toward the second I/O pad 405.

As shown in C2, an opening 408 penetrating the third substrate 410 may be formed, and a contact 407 may be formed in the opening 408. One end of the contact 407 may be connected to the second I/O pad 405 and the other end may be connected to the second I/O contact plug 403. Accordingly, the second I/O contact plug 403 may be electrically connected to the second I/O pad 405 through the contact 407 in the opening 408. In this case, as shown in C2, the diameter of the contact may be formed to increase toward the second I/O pad, and the diameter of the second I/O contact plug may be formed to decrease toward the second I/O pad. For example, the third I/O contact plug 403 may be formed together with the cell contact plugs 440 before the second cell region CELL2 and the first cell region CELL1 are bonded together, and the contact 407 may be formed after the second cell region CELL2 and the first cell region CELL1 are bonded together.

As shown in C3, compared to C2, a stopper 409 may be further formed on the upper surface of the opening 408 of the third substrate 410. The stopper 409 may be a metal wire formed on the same layer as the common source line 420. However, this is an example, and the stopper 409 may be a metal wire formed on the same layer as at least one of the word-lines 430. The second I/O contact plug 403 may be electrically connected to the second I/O pad 405 through the contact 407 and the stopper 409.

In addition, similar to the second and third I/O contact plugs 403 and 404 of the second cell region CELL2, each of the second and third I/O contact plugs 303 and 304 of the first cell region CELL1 may be formed to have a less diameter toward the lower metal pattern 371e or may be formed to have a greater diameter toward the lower metal pattern 371e.

Moreover, according to an embodiment, a slit 411 may be formed in the third substrate 410. For example, the slit 411 may be formed at an arbitrary position of the external pad bonding region PA. For example, as shown in D, the slit 411 may be located between the second I/O pad 405 and the cell contact plugs 440 when viewed from a plan view. However, this is an example, and the slit 411 may be formed where the second I/O pad 405 is positioned between the slit 411 and the cell contact plugs 440 when viewed from a plan view.

As shown in D2, the slit 411 may be formed to pass through the third substrate 410. The slit 411 may be used, for example, to prevent the third substrate 410 from being minutely cracked when forming the opening 408. However, this is an example, and the slit 411 may be formed to a depth of about 60% to about 70% of the thickness of the third substrate 410.

In addition, as shown in D2, a conductive material 412 may be formed in the slit 411. The conductive material 412 may be used, for example, to discharge leakage current generated during driving of circuit elements within the external pad bonding region PA to the outside. In this case, the conductive material 412 may be connected to an external ground line.

As shown in D3, an insulating material 413 may be formed in the slit 411. An insulating material 413 may be formed, for example, to electrically separate the second I/O pad 405 and the second I/O contact plug 403 disposed in the external pad bonding area PA from the word-line bonding area WLBA. By forming the insulating material 413 in the slit 411, the voltage provided through the second I/O pad 405 may be blocked from affecting the metal layer disposed on the third substrate 410 in the word-line bonding area WLBA.

Moreover, according to an embodiment, the first to third I/O pads 205, 405, and 406 may be selectively formed. For example, the non-volatile memory 500 may be implemented to include a first I/O pad 205 disposed on the first substrate 210a, a second I/O pad 405 disposed on the third substrate 410, or a third I/O pad 406 disposed on the upper insulating layer 401.

Furthermore, depending on device criteria and/or design choice, at least one of the second substrate 310 of the first cell region CELL1 and the third substrate 410 of the second cell region CELL2 may be used as a sacrificial substrate, and may be substantially completely or partially removed before or after the bonding process. Additional films may be deposited after substrate removal. For example, the second substrate 310 of the first cell region CELL1 may be removed before or after bonding of the peripheral circuit region PERI and the first cell region CELL1, and an insulating layer covering the upper surface of the common source line 320 or a conductive layer for connection may be formed. Similarly, the third substrate 410 of the second cell region CELL2 may be removed before or after bonding of the first cell region CELL1 and the second cell region CELL2, and an upper insulating layer 401 covering the upper surface of the common source line 420 or a conductive layer for connection may be formed.

While the inventive concept has been particularly shown and described by way of example with reference to embodiments thereof, it shall be understood by those of ordinary skill in the pertinent art that various changes in form and details may be made therein without departing from the spirit and scope of the following claims.

What is claimed is:

1. A storage device comprising:
    a memory controller; and
    a non-volatile memory;
    wherein the memory controller is configured to:
        calculate a number of zones, which are spaces allocated to logical addresses, based on a cell area size of first storage areas of the non-volatile memory, and provide the number of zones to a host;
        generate a plurality of zones of a number within the calculated number of zones, and map a logical address of each zone of the plurality of zones to a physical address of at least one of the first storage areas;
        in response to a first write request from the host, write first data included in the first write request into first storage areas corresponding to a zone indicated by the first write request,
        receive a second write request from the host; and
        vary the cell area size of the first storage areas for second data from the second write request based on at least one of the locality of the second data, the type of the second data, or the size of an area included in the second write request from the host.

2. The storage device of claim 1, wherein the memory controller is further configured to:
    generate the plurality of zones based on a type and locality of the first data.

3. The storage device of claim 2, wherein the memory controller is further configured to generate a first zone corresponding to hot data, a second zone corresponding to hot nodes, a third zone corresponding to warm data, a fourth zone corresponding to warm nodes, a fifth zone corresponding to cold data, and a sixth zone corresponding to cold nodes.

4. The storage device of claim 2,
    wherein the storage device further comprises a device memory for temporarily storing data to be written into the non-volatile memory, and
    wherein the device memory is further configured to include buffer areas respectively corresponding to zones generated based on a type and locality of data to be written.

5. The storage device of claim 4, wherein the memory controller is further configured to:
    temporarily store data included in the first write request in a first buffer area of the device memory corresponding to a first zone; and
    when a storage space of the first buffer area remains and a second write request including data to be written into a second zone different from the first zone is received from the host, write data included in the first write request into a first storage area corresponding to the first zone, in response to a second write request of the host.

6. The storage device of claim 1, wherein the memory controller is further configured to, in response to the request of the host, calculate the number of zones, which are spaces allocated to logical addresses, based on the number of super blocks to be used as super blocks of the first storage areas among a plurality of super blocks of the non-volatile memory included in the request.

7. The storage device of claim 1, wherein the memory controller is further configured to:
    migrate data stored in the first storage areas to second storage areas.

8. The storage device of claim 7,
    wherein the first storage areas include single-level cells, and
    wherein the second storage areas include multi-level cells.

9. The storage device of claim 2, wherein the memory controller is further configured to generate the plurality of zones where cell area sizes of storage areas allocated to zones corresponding to hot data are greater than cell area sizes of storage areas allocated to zones corresponding to cold data.

10. An operating method of a storage device including a memory controller and a non-volatile memory, the method comprising:
    calculating a number of zones, which are spaces allocated to logical addresses, based on cell area sizes of first storage areas of a non-volatile memory;
    providing the number of zones to a host;
    generating a plurality of zones of a number within the calculated number of zones;
    mapping a logical address of each zone to a physical address of at least one of the first storage areas; and
    in response to a first write request from the host, writing data included in the first write request into first storage areas corresponding to a zone indicated by the first write request,
    wherein the generating of the plurality of zones includes generating the plurality of zones where cell area sizes of storage areas allocated to zones corresponding to hot data are greater than cell area sizes of storage areas allocated to zones corresponding to cold data.

11. The method of claim 10, wherein the generating of the plurality of zones includes generating the plurality of zones based on a type and a locality of data to be written.

12. The method of claim 10, wherein the generating of the plurality of zones includes generating a first zone corresponding to hot data, a second zone corresponding to hot nodes, a third zone corresponding to warm data, a fourth zone corresponding to warm nodes, a fifth zone corresponding to cold data, and a sixth zone corresponding to cold nodes.

13. The method of claim 11,
    wherein the writing of the data into first storage areas includes temporarily storing data included in the first write request in a first buffer area of a device memory corresponding to a first zone, and wherein when a storage space of the first buffer area remains and a second write request from the host including data to be written into a second zone different from the first zone is received, writing data included in the first write request into a first storage area corresponding to the first zone, in response to a second write request from the host.

14. The method of claim 10, wherein the calculating of the number of zones includes calculating the number of zones, which are spaces allocated to logical addresses, based on the number of super blocks to be used as super blocks of the first storage areas among a plurality of super blocks of the non-volatile memory included in the request, in response to the request of the host.

15. The method of claim 10, further comprising:
in response to a second write request from the host, varying the cell area size of the first storage areas for second data from the second write request based on at least one of the locality of the second data, the type of the second data, or the size of an area included in the second write request from the host; and
migrating data stored in the first storage areas to second storage areas.

16. The method of claim 15,
wherein the first storage areas include single-level cells, and
wherein the second storage areas include multi-level cells.

17. A storage system comprising a host and a storage device, wherein the storage device is configured to:
calculate a number of zones, which are spaces allocated to logical addresses, based on a cell area size of first storage areas of the storage device, and provide the number of zones to a host;
generate a plurality of zones of a number within the calculated number of zones, and map a logical address of each zone to a physical address of at least one of the first storage areas;
in response to a first write request from the host, write data included in the first write request into first storage areas corresponding to a zone indicated by the first write request; and
generate the plurality of zones where cell area sizes of storage areas allocated to zones corresponding to hot data are greater than cell area sizes of storage areas allocated to zones corresponding to cold data.

18. The storage system of claim 17, wherein the storage device is configured to generate the plurality of zones, based on a type and locality of data to be written.

19. The storage system of claim 18, wherein the storage device is configured to generate a first zone corresponding to hot data, a second zone corresponding to hot nodes, a third zone corresponding to warm data, a fourth zone corresponding to warm nodes, a fifth zone corresponding to cold data, and a sixth zone corresponding to cold nodes.

20. The storage system of claim 17, wherein the storage device is further configured to:
receive a second write request from the host; and
vary the cell area size of the first storage areas for second data from the second write request based on at least one of the locality of the second data, the type of the second data, or the size of an area included in the second write request from the host.

* * * * *